US011405300B2

(12) United States Patent
Kushmerick et al.

(10) Patent No.: US 11,405,300 B2
(45) Date of Patent: Aug. 2, 2022

(54) METHODS AND SYSTEMS TO ADJUST RESOURCES AND MONITORING CONFIGURATION OF OBJECTS IN A DISTRIBUTED COMPUTING SYSTEM

(71) Applicant: VMware, Inc., Palo Alto, CA (US)

(72) Inventors: Nicholas Kushmerick, Seattle, WA (US); Vardan Movsisyan, Yerevan (AM); Steven Flanders, Nashua, NH (US)

(73) Assignee: VMware, Inc., Palo Alto, CA (US)

( * ) Notice: Subject to any disclaimer, the term of this patent is extended or adjusted under 35 U.S.C. 154(b) by 740 days.

(21) Appl. No.: 15/628,333

(22) Filed: Jun. 20, 2017

(65) Prior Publication Data
US 2018/0367434 A1 Dec. 20, 2018

(51) Int. Cl.
| | |
|---|---|
| *H04L 43/16* | (2022.01) |
| *H04W 72/04* | (2009.01) |
| *H04L 41/0681* | (2022.01) |
| *H04L 43/00* | (2022.01) |
| *H04L 41/0896* | (2022.01) |
| *H04L 43/04* | (2022.01) |
| *H04L 41/0893* | (2022.01) |

(52) U.S. Cl.
CPC .......... *H04L 43/16* (2013.01); *H04L 41/0681* (2013.01); *H04L 41/0893* (2013.01); *H04L 41/0896* (2013.01); *H04L 43/04* (2013.01); *H04L 43/14* (2013.01); *H04W 72/048* (2013.01)

(58) Field of Classification Search
CPC . H04L 43/16; H04L 41/0681; H04L 41/0893; H04L 41/0896; H04L 43/04; H04L 43/14; H04W 72/048
USPC .................................................. 709/220, 223
See application file for complete search history.

(56) References Cited

U.S. PATENT DOCUMENTS

| | | | | |
|---|---|---|---|---|
| 5,913,061 | A * | 6/1999 | Gupta | G06Q 10/10 718/101 |
| 6,754,664 | B1 * | 6/2004 | Bush | H04L 29/06 |
| 6,785,713 | B1 * | 8/2004 | Freeman | G06F 9/5027 709/208 |
| 6,829,639 | B1 * | 12/2004 | Lawson | H04L 41/069 707/999.01 |
| 7,062,642 | B1 * | 6/2006 | Langrind | H04L 41/0672 398/50 |

(Continued)

*Primary Examiner* — Michael Won

(57) ABSTRACT

Methods and systems automatically adjusting resources and monitoring configurations of objects of a distributed computing system in response to changes to application programs. Methods search event messages for information indicating a change in execution of an object. The information is used to determine resource allocation rules of infrastructure resources by and a monitoring configuration for the object. Expected impacts on the infrastructure resource are determined from the rules. When an expected impact is greater than an associated impact threshold, use of the infrastructure resources may be adjusted to accommodate the changes. The adjustments include scaling up or down the infrastructure resources. When the object is a virtual object, the virtual object may be migrated from one server computer to another server computer within the distributed computer system. The monitoring configuration is used to adjust tools that monitor the objects of the distributed computing system.

27 Claims, 34 Drawing Sheets

(56) References Cited

U.S. PATENT DOCUMENTS

| | | | | |
|---|---|---|---|---|
| 7,464,152 B2* | 12/2008 | Ishizaki | G06Q 10/06 | 709/223 |
| 7,568,019 B1* | 7/2009 | Bhargava | G06Q 10/06 | 709/223 |
| 8,046,466 B2* | 10/2011 | Sutou | G06F 9/5083 | 709/223 |
| 8,918,512 B2* | 12/2014 | Frey | G06F 9/5077 | 709/224 |
| 9,111,088 B2* | 8/2015 | Ghai | G06F 21/55 | |
| 10,268,514 B1* | 4/2019 | Kesarwani | G06F 9/5011 | |
| 2002/0152305 A1* | 10/2002 | Jackson | H04L 41/5035 | 709/224 |
| 2003/0046396 A1* | 3/2003 | Richter | G06F 9/505 | 709/226 |
| 2004/0128370 A1* | 7/2004 | Kortright | H04L 41/082 | 709/221 |
| 2005/0036443 A1* | 2/2005 | Collins | G06F 8/60 | 370/216 |
| 2006/0041660 A1* | 2/2006 | Bishop | H04L 41/065 | 709/224 |
| 2006/0064486 A1* | 3/2006 | Baron | H04L 41/0886 | 709/224 |
| 2007/0169049 A1* | 7/2007 | Gingell | G06F 8/61 | 717/151 |
| 2007/0271570 A1* | 11/2007 | Brown | G06F 9/5033 | 718/105 |
| 2008/0010315 A1* | 1/2008 | McKinley | G06F 11/1482 | |
| 2008/0155336 A1* | 6/2008 | Joshi | G06F 11/008 | 714/37 |
| 2009/0144393 A1* | 6/2009 | Kudo | G06F 9/5044 | 709/218 |
| 2010/0145929 A1* | 6/2010 | Burger | G06F 16/24545 | 707/713 |
| 2010/0306767 A1* | 12/2010 | Dehaan | G06F 9/5077 | 718/1 |
| 2012/0204267 A1* | 8/2012 | Prafullchandra | G06Q 10/06 | 726/25 |
| 2012/0221690 A1* | 8/2012 | Beaty | H04L 43/0817 | 709/221 |
| 2012/0254269 A1* | 10/2012 | Carmichael | H04L 43/0876 | 707/827 |
| 2013/0086129 A1* | 4/2013 | Brown | G06F 9/5011 | 707/812 |
| 2013/0247202 A1* | 9/2013 | Yablokov | G06F 21/561 | 726/24 |
| 2013/0268914 A1* | 10/2013 | Oslake | G06F 9/5072 | 717/120 |
| 2013/0326044 A1* | 12/2013 | Maldaner | G06F 9/5083 | 709/223 |
| 2014/0129719 A1* | 5/2014 | Weber | H04L 47/823 | 709/226 |
| 2016/0012366 A1* | 1/2016 | Srivastava | G06Q 10/06313 | 705/7.23 |
| 2016/0139948 A1* | 5/2016 | Beveridge | G06F 9/45558 | 718/1 |
| 2018/0365044 A1* | 12/2018 | Movsisyan | G06F 9/45558 | |
| 2019/0340094 A1* | 11/2019 | Lu | H04L 41/0618 | |

* cited by examiner log.write([$Time_date] [Thread-$X/$IP/INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[$Time_date] Repair session $RS for range $range finished)

FIG. 15

[2015-03-10 23:43:36.859+0000] [Thread-1822496/127.0.0.1 INFO]
[com.vmware.loginsight.commons.executor.ProcessExecutor] [ [[/usr/lib/loginsight/application/
lib/apache-cassandra-2 0 10/bin/nodetool, -h, montools-prod-loginsight.vmware.com, repair]]
[2015-03-10 23:43:36,716] Repair session 51312720-c77e-11e4-ad72-4769d614a3f2 for range
(-6899937477723537626, -6896547230076663429) finished]

FIG. 16

```
2013-12-02T10:44:24.095Z li-qe-esx5.vmware.com Rhttpproxy:
[28959B90 verbose 'Proxy Req 46691'] Connected to
localhost:8307

2013-12-02T10:44:24.094Z li-qe-esx5.vmware.com Rhttpproxy:
[FFFC2B90 verbose 'Proxy Req 46691'] new proxy client
TCP (local-127.0.0.1:80, peer=127.0.0.1:50155)

2013-12-02T10:44:24.093Z li-qe-esx5.vmware.com Rhttpproxy:
[2889B90 verbose 'Proxy Req 46685'] The client closed the
stream, not unexpectedly.

Dec  2 18:48:29 strata-vc 2013-12-02T18:48:30.273Z
[7FA39448B700 info 'commonvpxLro' opID=1947d6f9]   [VpxLRO] -
FINISH task-internal-2163522 -- -- vim.SessionManager.logout 2013-12-02T18:48:51.396Z strata-esx1.eng.vmware.com Vpxa:
[65B5AB90 verbose 'VpxaHalCnxHostagent' opID=WFU-ed393333]
[WaitForUpdatesDone] Completed callback 2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed
```

FIG. 17

METHODS AND SYSTEMS TO ADJUST RESOURCES AND MONITORING CONFIGURATION OF OBJECTS IN A DISTRIBUTED COMPUTING SYSTEM

TECHNICAL FIELD

The present disclosure is directed to monitoring and adjusting resources and virtual object's monitoring configuration of a distributed computing system.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies.

Server computers of a distributed computing system are typically used to run application programs called "servers" that provide software services for other application programs called "clients." Servers may share data or resources among many clients, perform computational tasks for clients, or provide services requested by clients. A Web server is an example of an application program that serves requested Web pages or files to Web clients that may be Web browsers. When a new application program is added to a distributed computing system or new services are enabled or started in the distributed computing system, network traffic typically increases and the demand for resources, such as processing power, memory, and data storage, of the distributed computing system also increases. Currently, system administrators manually reconfigure resources of distributed computing systems to accommodate increased demands for resources created by new application program or software services and manually change monitoring configurations that used to monitor new services, which is time consuming, error prone, and increases costs.

SUMMARY

Methods and systems are directed to automatically adjusting resources and monitoring configurations of objects of a distributed computing system in response to changes to application programs. In one aspect, a method stored in one or more data-storage devices and executed using one or more processors of a management server computer of a distributed computing system searches event messages received at the management server computer for information that indicates a change in an object of the distributed computing system. The object may be a virtual object, such as a virtual machine or a container, or a physical object, such as a physical computer. The change may be installation of an application program on the object, starting services provided by an application program already installed on the object, removing an application program from the object, or reconfiguring an application program running on the object. The information is used to determine resource allocation rules of infrastructure resources used by the object and expected monitoring configuration for the object. An expected impact on the infrastructure resources is determined from the resource allocation rules. When an expected impact to a object is greater than an associated impact threshold, use of the infrastructure resources by the object may be adjusted to accommodate the expected use of infrastructure resources by the object. The adjustments may include scaling up or down the infrastructure resources or even migrating a changed virtual object from one server computer to another server computer within the distributed computer system. In the case of virtual and physical objects, the expected monitoring configuration is used to change the monitoring configuration of tools used to monitor objects of the distributed computing system.

DESCRIPTION OF THE DRAWINGS

FIG. 15 shows an example of a Log write instruction.
FIG. 16 shows an example of an event message generated by a log write instruction.
FIG. 17 shows a small, eight-entry portion of an event log.

DETAILED DESCRIPTION

Figure 1:
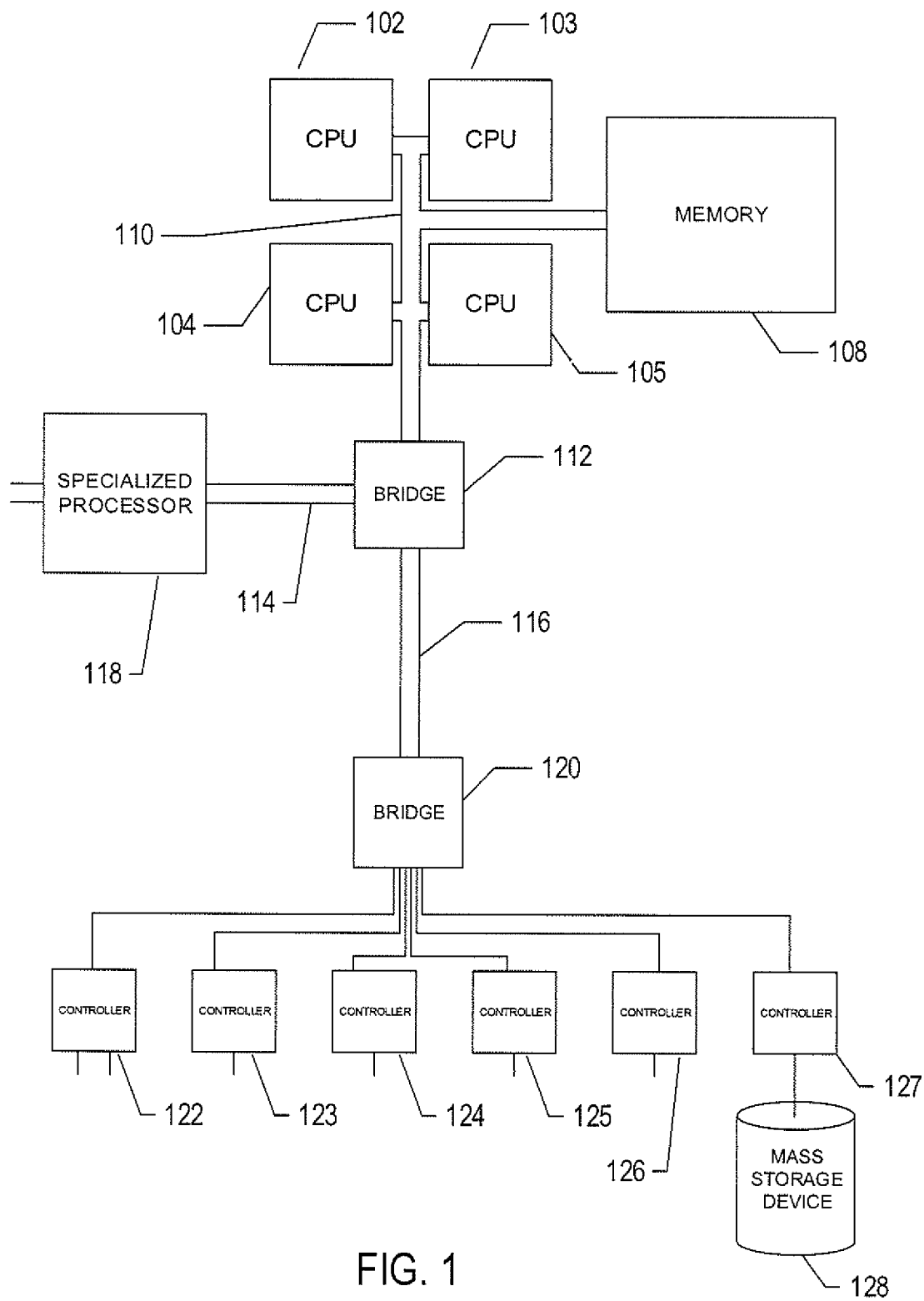
FIG. 1 shows a general architectural diagram for various types of computers.

This disclosure presents computational methods and systems to monitor and adjust resources of a distributed computing in response to changes in services. In a first subsection, computer hardware, complex computational systems, and virtualization are described. Containers and containers supported by virtualization layers are described in a second subsection. Logging event messages in event logs is described in a third subsection. Methods to adjust resources and monitoring configuration of objects in a distributed computing system are described below in a fourth subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
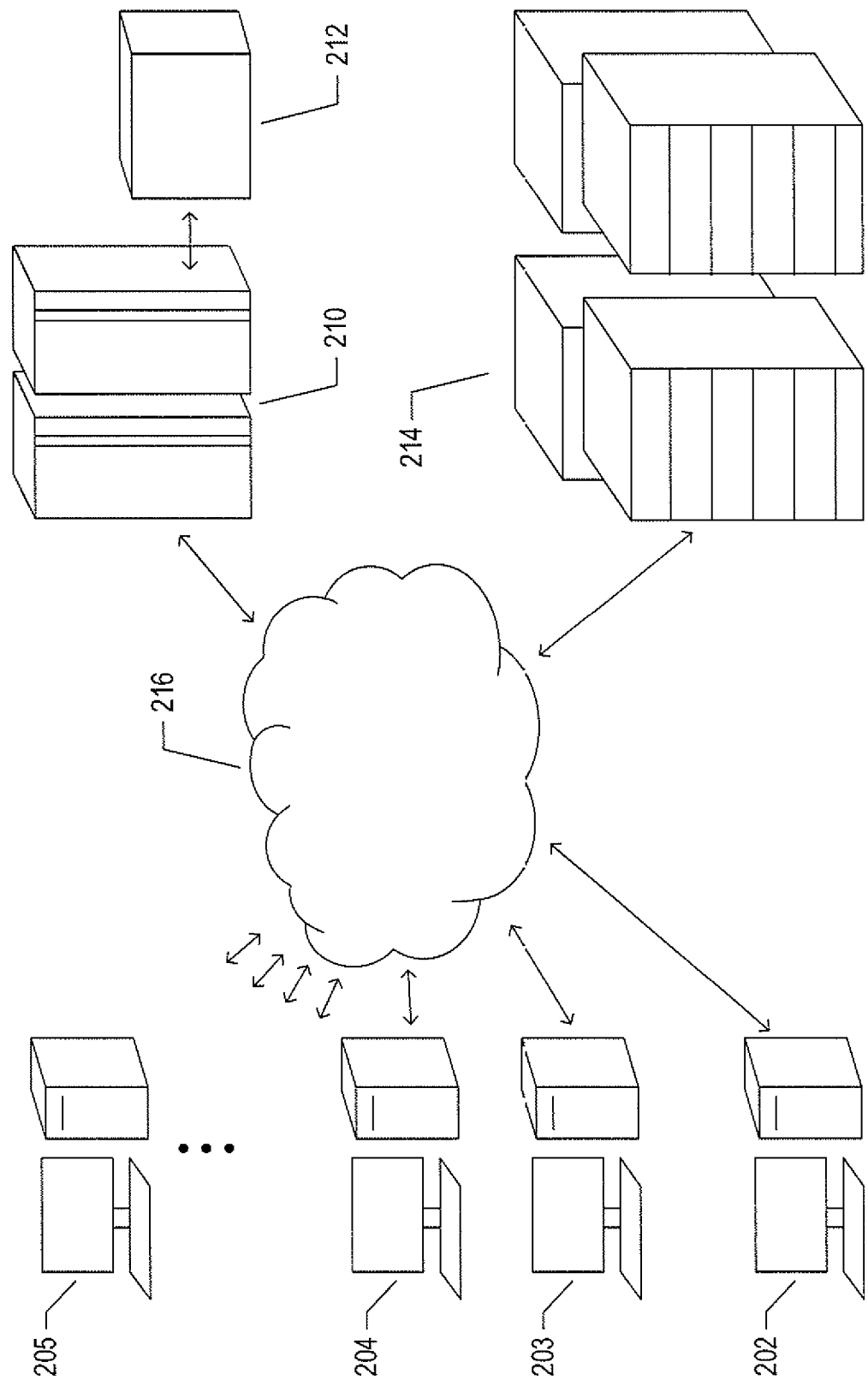
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
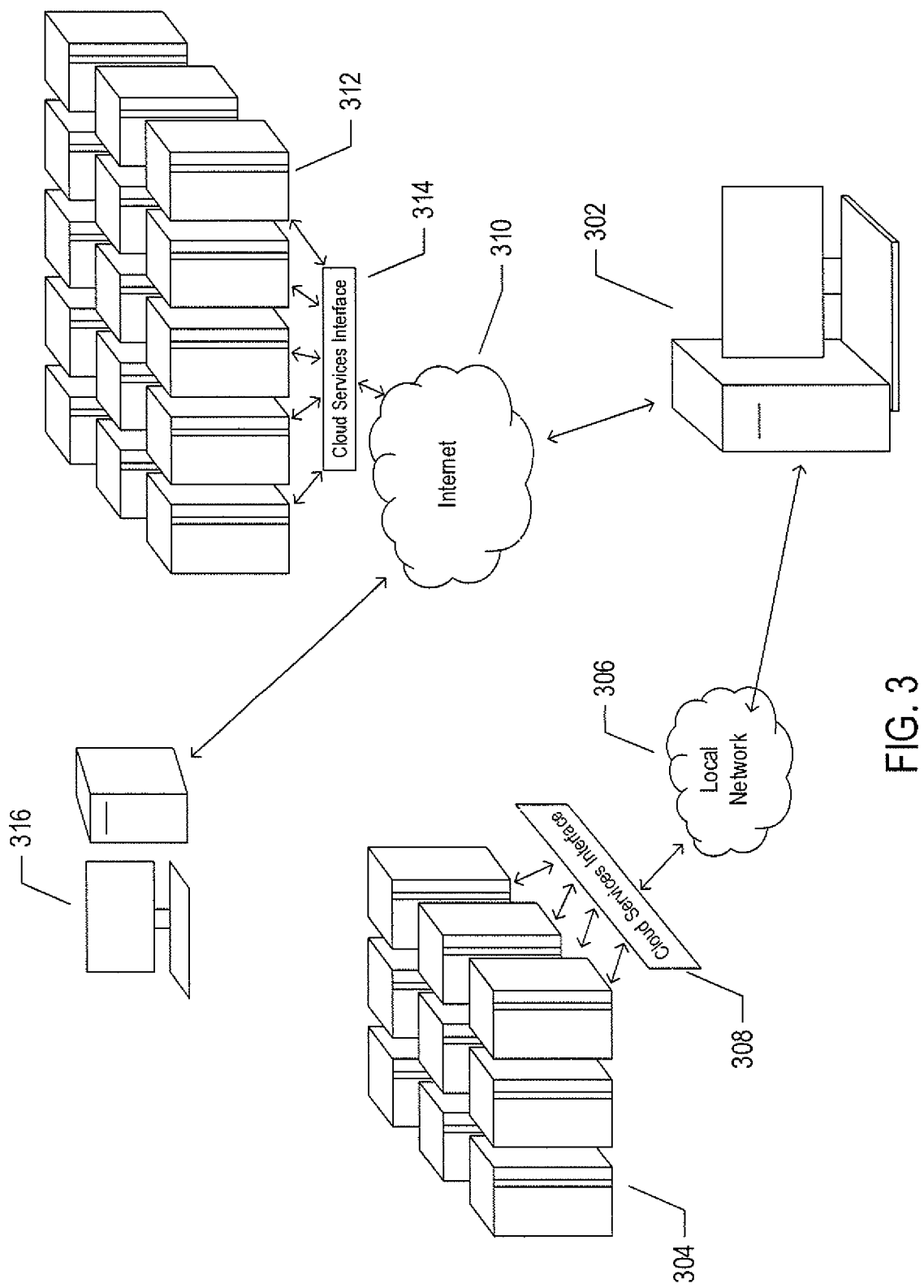
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
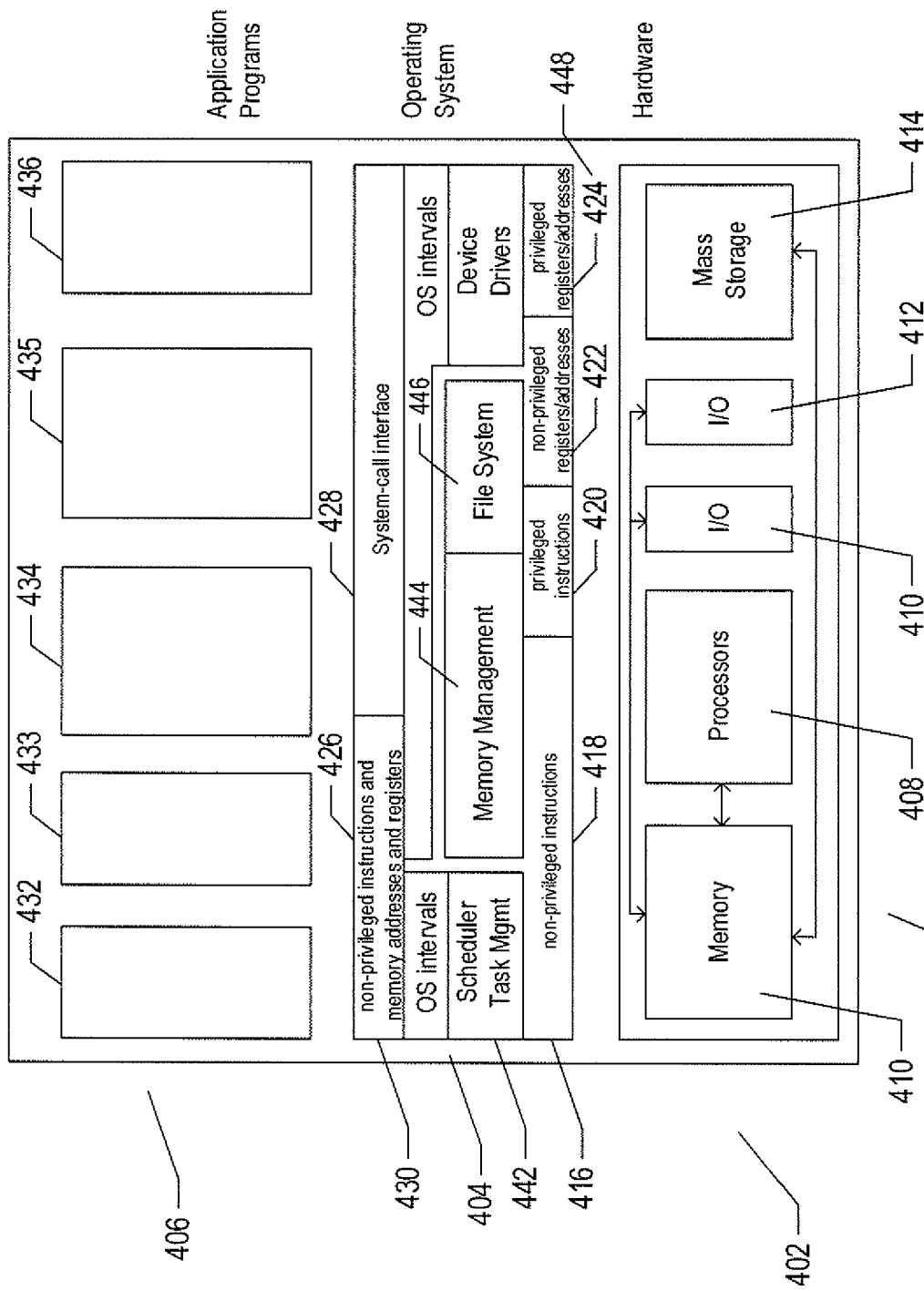
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
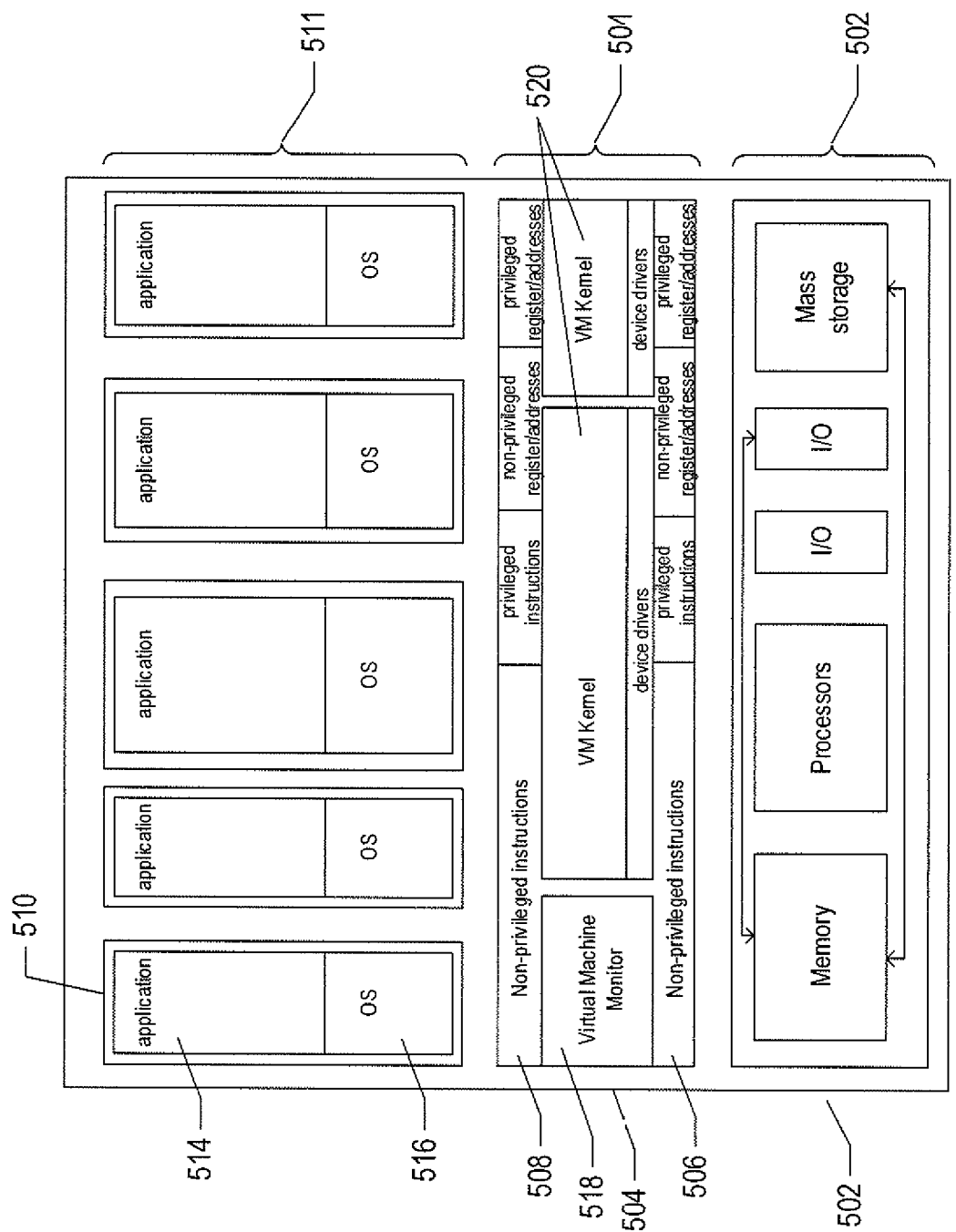
FIGS. 5A-5B show two types of virtual machine ("VM") and VM execution environments.
Figure 5B:
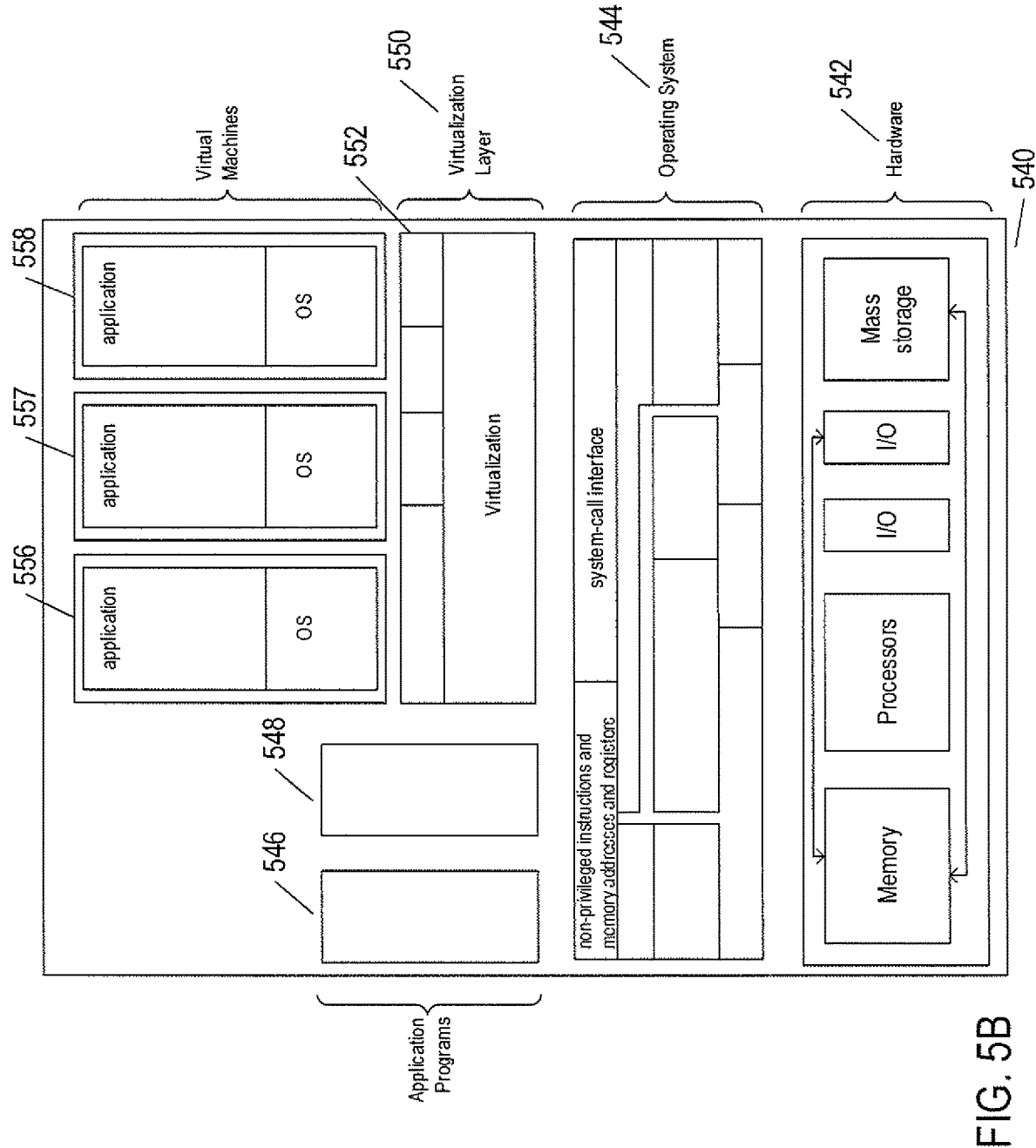

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control tie operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver Incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
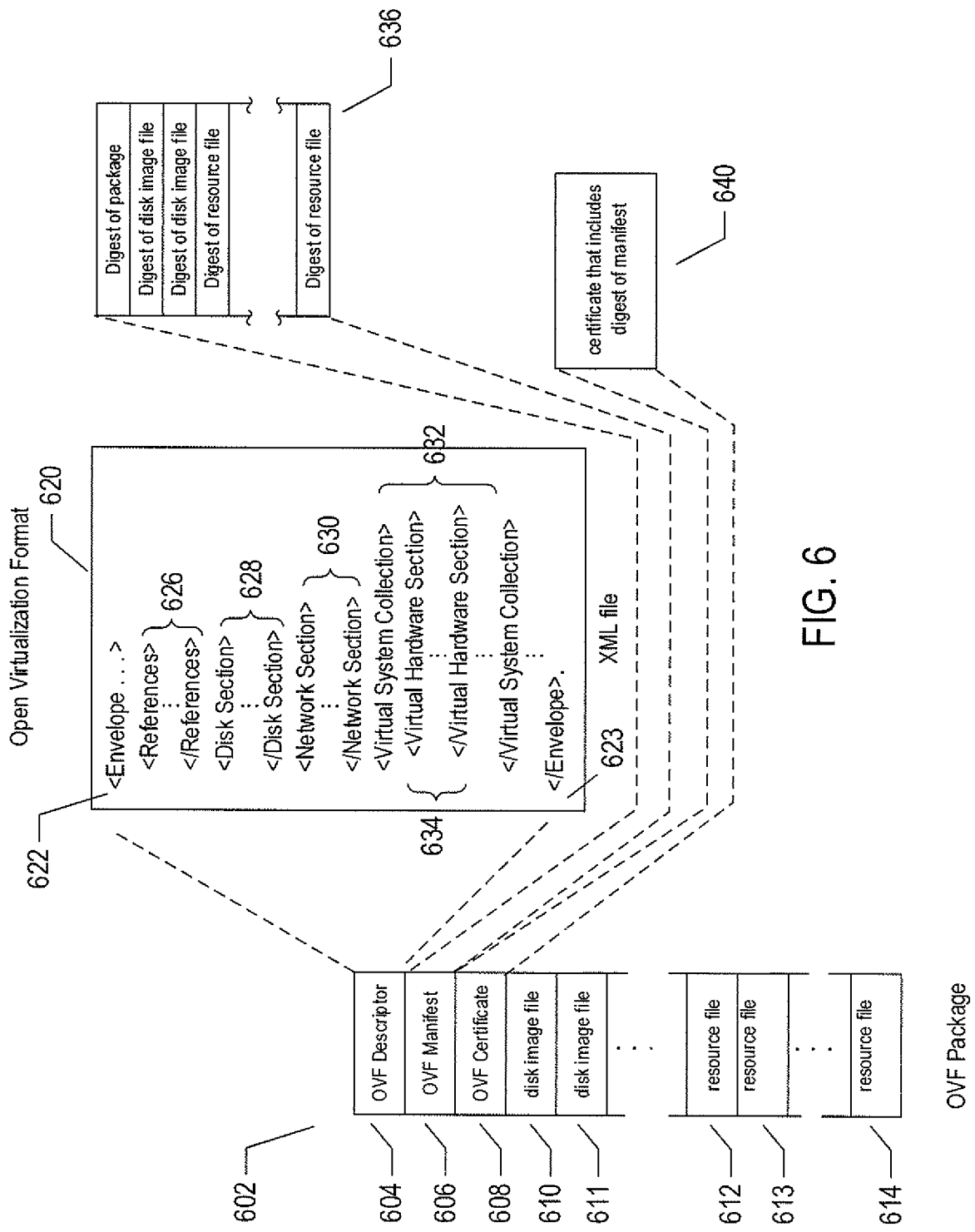
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
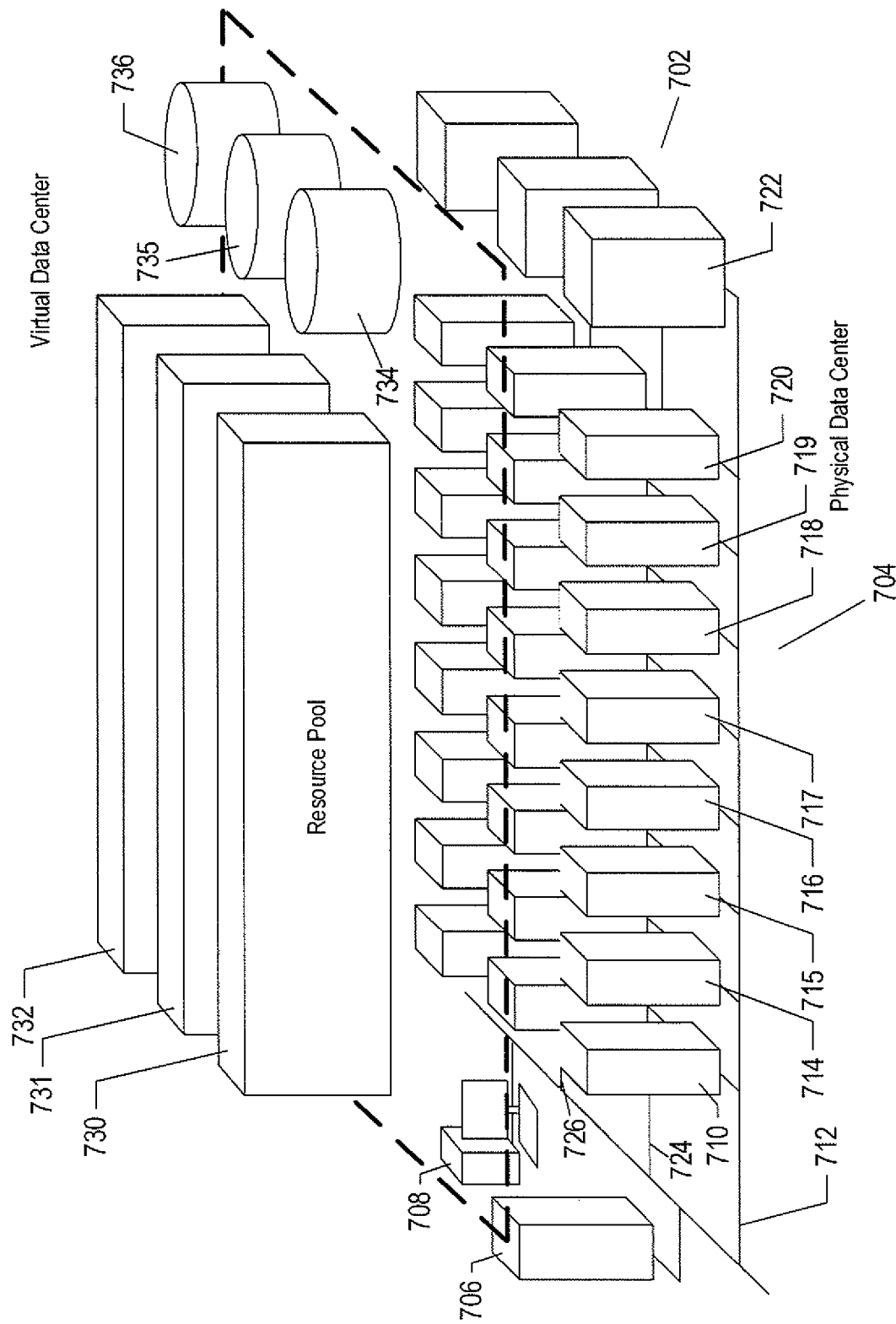
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
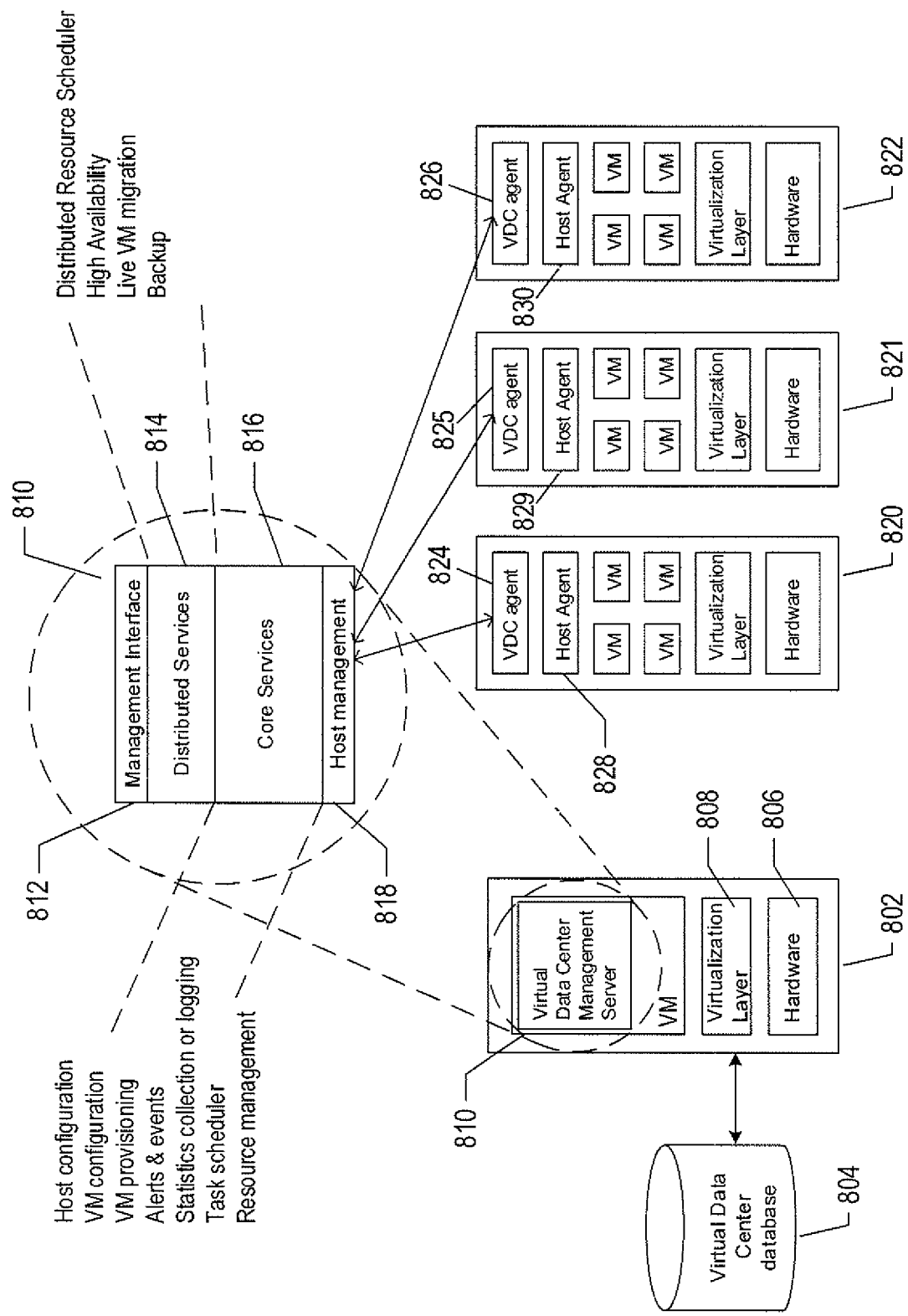
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808, and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for off-loading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
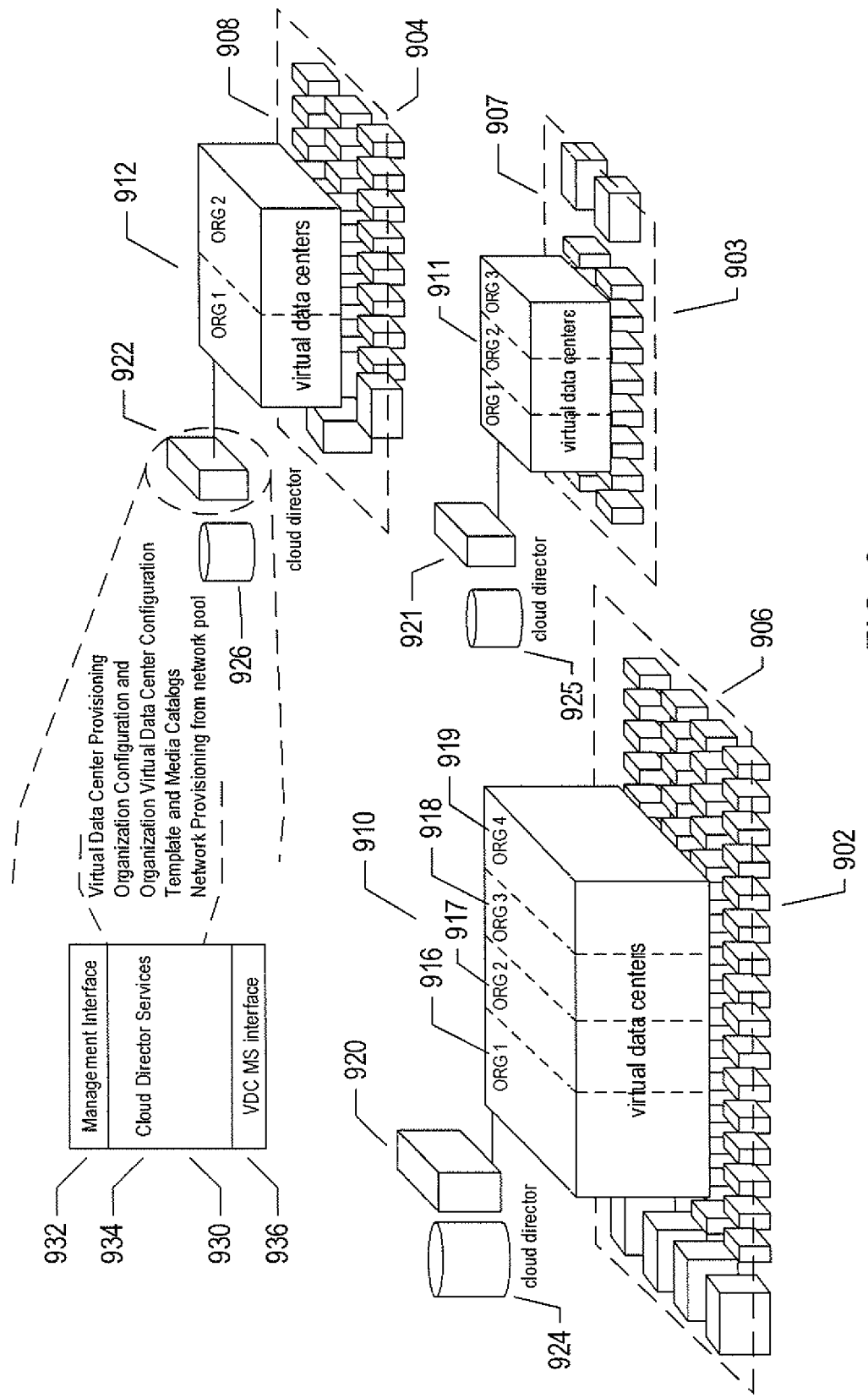
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
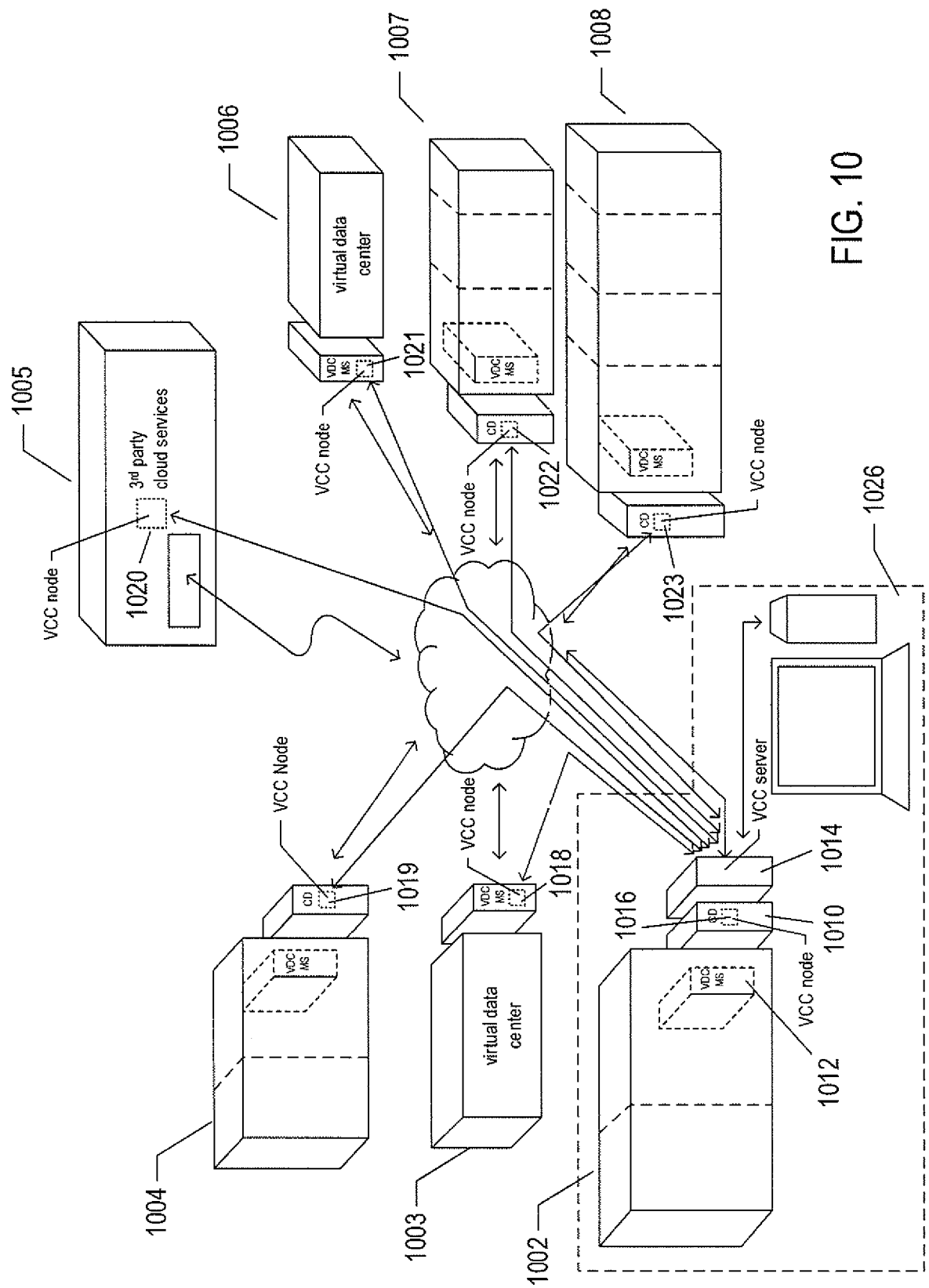
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces t a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Containers and Containers Supported by Virtualization Layers

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
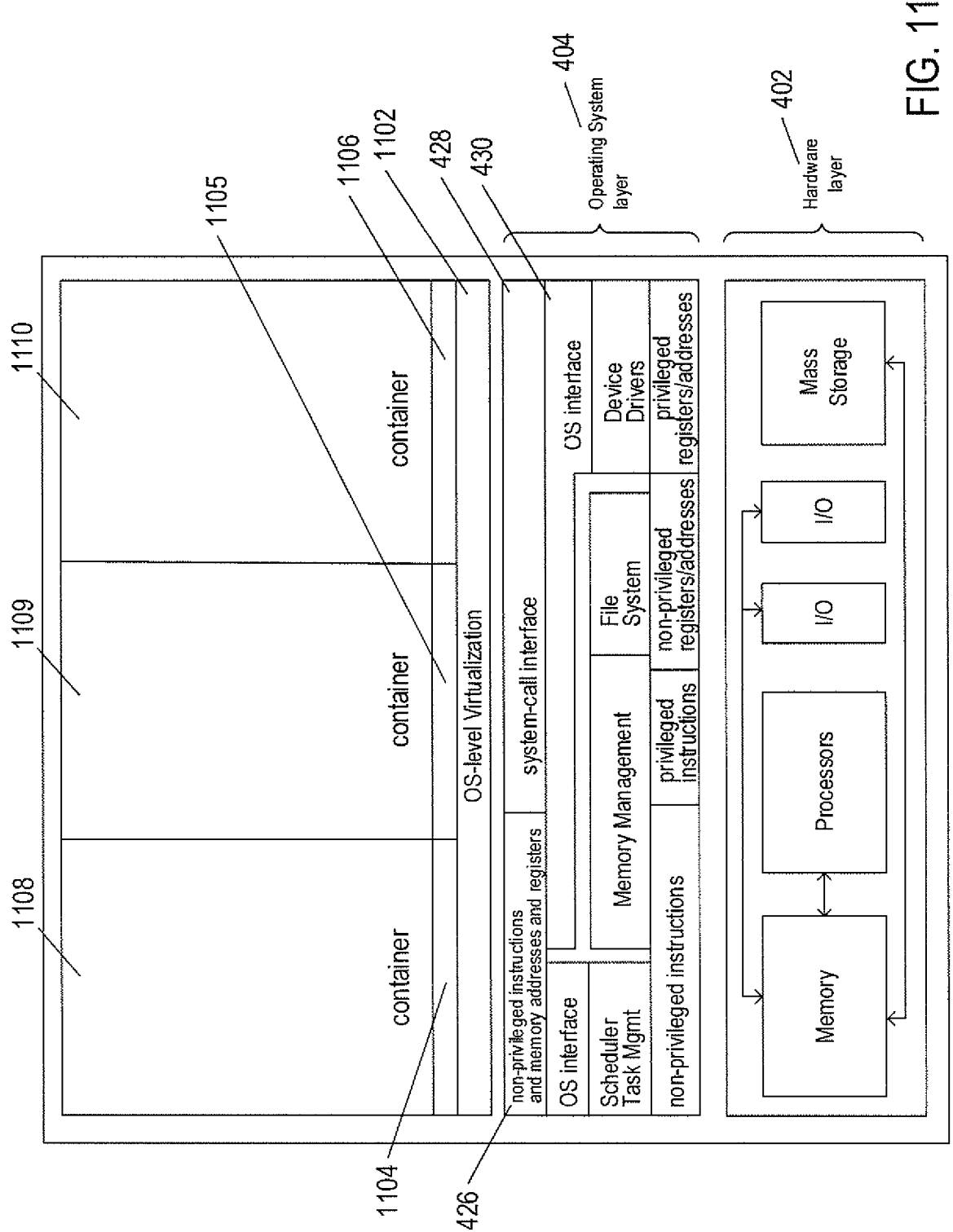
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
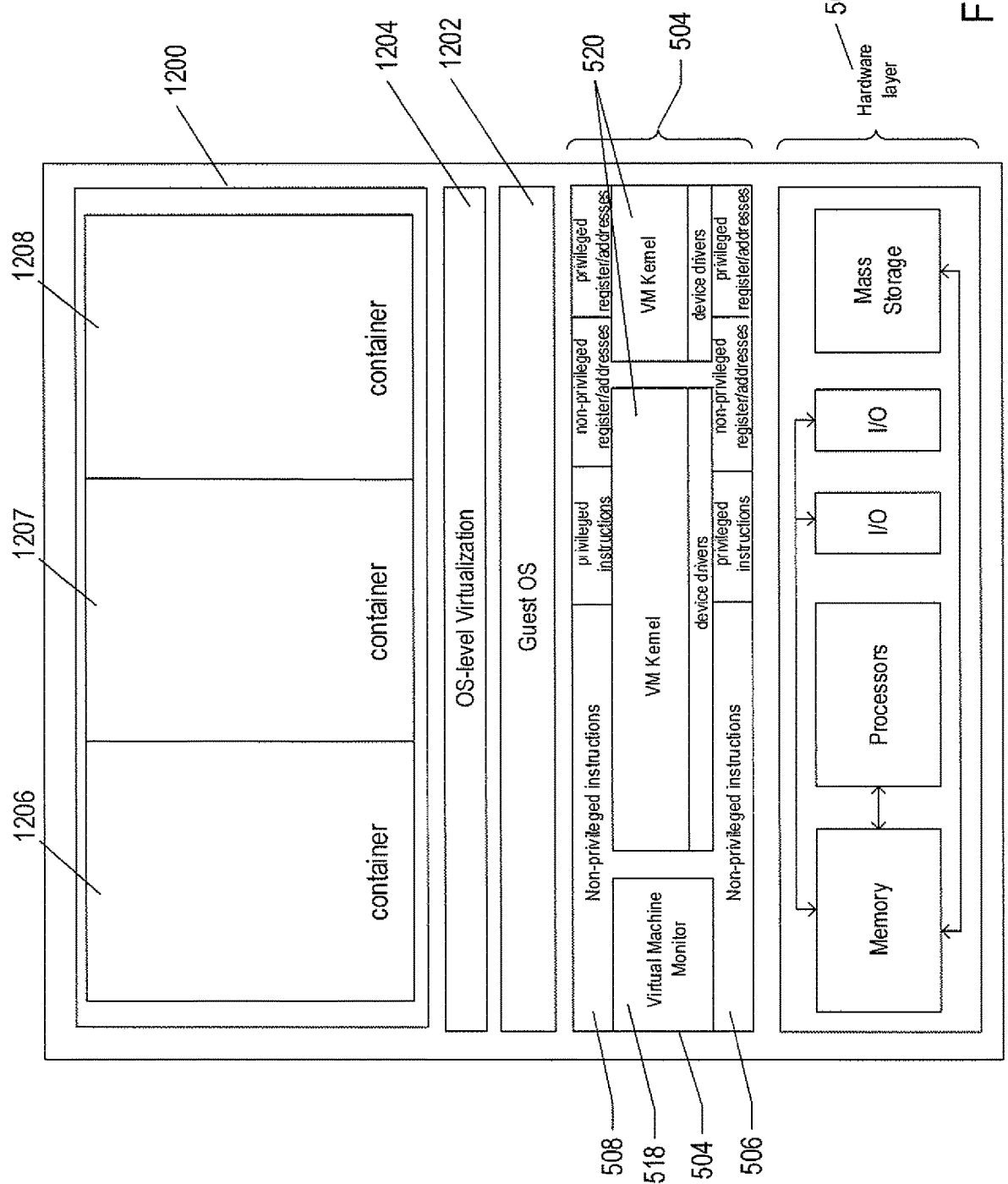
FIG. 12 shows an approach to implementing the containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Logging Event Messages in Event Logs

Figure 13:
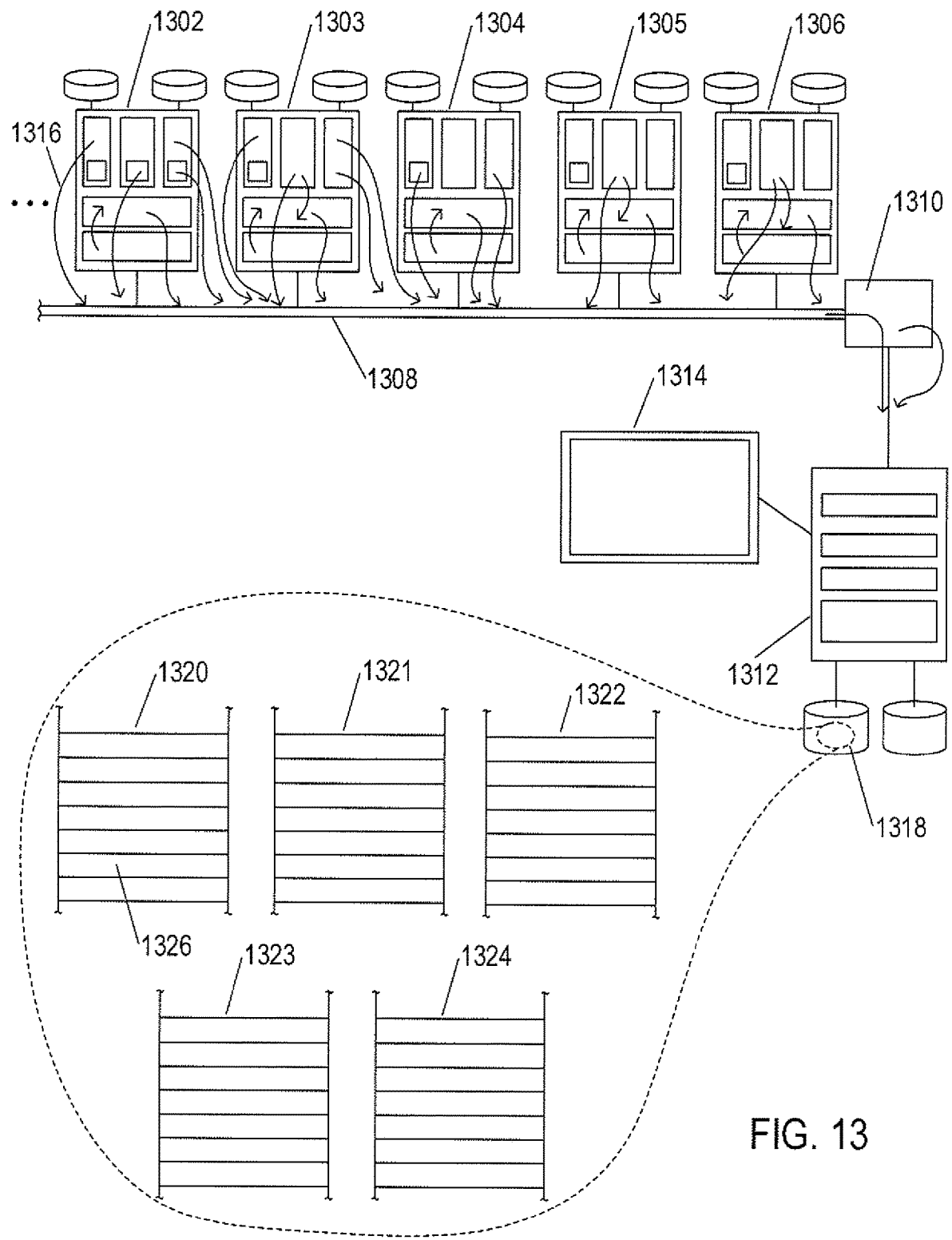
FIG. 13 shows an example of logging event messages in event logs.

FIG. 13 shows an example of logging event messages in event logs. In FIG. 13, a number of computer systems 1302-1306 within a distributed computing system are linked together by an electronic communications medium 1308 and additionally linked through a communications bridge/router 1310 to an administration computer system 1312 that includes an administrative console 1314. One or more of the computer systems 1302-1306 may run a log monitoring agent that collects and forwards event messages to a log management server that runs on the administration console 1314. As indicated by curved arrows, such as curved arrow 1316, multiple components within each of the discrete computer systems 1302-1306 as well as the communications bridge/router 1310 generate event messages that are forwarded to the log management server. Event messages may be generated by any event source. Event sources may be, but are not limited to, application programs, operating systems, VMs, guest operating systems, containers, network devices, machine codes, event channels, and other computer programs or processes running on the computer systems 1302-1306, the bridge/router 1310 and any other components of the distributed computing system. Event messages may be collected at various hierarchical levels within a discrete computer system and then forwarded to the log management server in the administration computer 1312. For example, a log monitoring agent may collect and forward the event messages at various hierarchical levels. The log management server in the administration computer 1312 collects and stores the received event messages in a data-storage device or appliance 1318 as event logs 1320-1324. Rectangles, such as rectangle 1326, represent individual event messages. For example, event log 1320 may comprise a list of event messages generated within the computer system 1302. Each log monitoring agent has an agent monitoring configuration that includes a log path and a log parser. The log path specifies a unique file system path in terms of a directory tree hierarchy that identifies the storage location of an event log associated with the event source on the administrative console 1314 or the data-storage device or appliance 1318. The log monitoring agent receives specific file and event channel log paths to monitor event logs and the log parser includes log parsing rules to extract and format lines of event message into event message fields. The log monitoring agent then sends the constructed structured event messages to the log management server. The administrative console 1314 and computer systems 1302-1306 can function without log management agents and a log management server, but with less precision and certainty.

Figure 14:
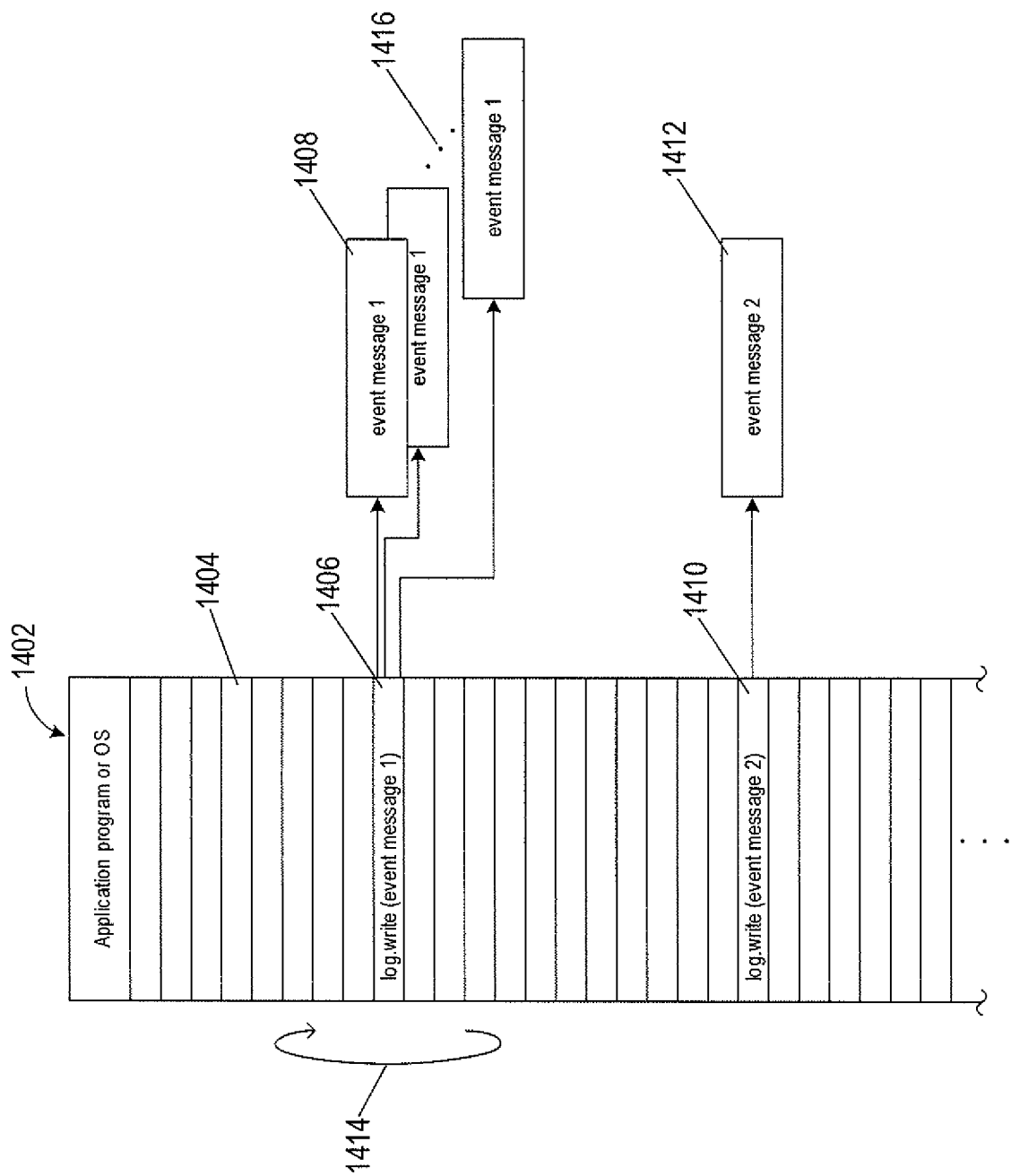
FIG. 14 shows an example of a source code with log write instructions.

FIG. 14 shows an example of a source code 1402 of an application program, an operating system, a VM, a guest operating system, or any other computer program or machine code. The source code 1402 is just one example of an event source that generates event messages. Rectangles, such as rectangle 1404, represent a definition, a comment, a statement, or a computer instruction that expresses some action to be executed by a computer. The source code 1402 includes log write instructions that generate event messages when certain events predetermined by the developer occur during execution of the source code 1402. For example, source code 1402 includes an example log write instruction 1406 that when executed generates an "event message 1" represented by rectangle 1408, and a second example log write instruction 1410 that when executed generates "event message 2" represented by rectangle 1412. In the example of FIG. 14, the log write instruction 1408 is embedded within a set of computer instructions that are repeatedly executed in a loop 1414. As shown in FIG. 14, the same event message 1 is repeatedly generated 1416. The same type of log write instructions may also be located in different places throughout the source code, which in turns creates repeats of essentially the same type of event message in the event log.

In FIG. 14, the notation "log.write( )" is a general representation of a log write instruction. In practice, the form of the log write instruction varies for different programming languages. In general, event messages are relatively cryptic, including generally only one or two natural-language words and/or phrases as well as various types of text strings that represent file names, path names, and, perhaps various alphanumeric parameters. In practice, a log write instruction may also include the name of the source of the event message (e.g., name of the application program or operating system and version) and the name of the event log to which the event message is written. Log write instructions may be written in a source code by the developer of an application program or operating system in order to record events that occur while an operating system or application program is running. For example, a developer may include log write instructions that are executed when certain events occur, such as failures, logins, or errors.

FIG. 15 shows an example of a log write instruction 1502. In the example of FIG. 15, the log write instruction 1502 includes arguments identified with "$." For example, the log write instruction 1502 includes a time-stamp argument 1504, a thread number argument 1505, and an internet protocol ("IP") address argument 1506. The example log write instruction 1502 also includes text strings and natural-language words and phrases that identify the type of event that triggered the log write instruction, such as "Repair session" 1508. The text strings between brackets "[ ]" represent file-system paths, such as path 1510. When the log write instruction 1502 is executed, parameters are assigned to the arguments and the text strings and natural-language words and phrases are stored as an event message in an event log.

FIG. 16 shows an example of an event message 1602 generated by the log write instruction 1502. The arguments of the log write instruction 1502 may be assigned numerical parameters that are recorded in the event message 1602 at the time the event message is written to the event log. For example, the time stamp 1504, thread 1505, and IP address 1506 of the log write instruction 1502 are assigned corresponding numerical parameters 1604-1606 in the event message 1602. The time stamp 1604, in particular, represents the date and time the event message is generated. The text strings and natural-language words and phrases of the log write instruction 1502 also appear unchanged in the event message 1602 and may be used to identify the type of event that occurred during execution of the application program or operating system.

As event messages are received from various event sources, the event messages are stored in the order in which the event messages are received. FIG. 17 shows a small, eight-entry portion of an event log 1702. In FIG. 17, each rectangular cell, such as rectangular cell 1704, of the portion of the event log 1702 represents a single stored event message. For example, event message 1702 includes a short natural-language phrase 1706, date 1708 and time 1710 numerical parameters, as well as, an alphanumeric parameter 1712 that appears to identify a particular host computer.

Figure 18:
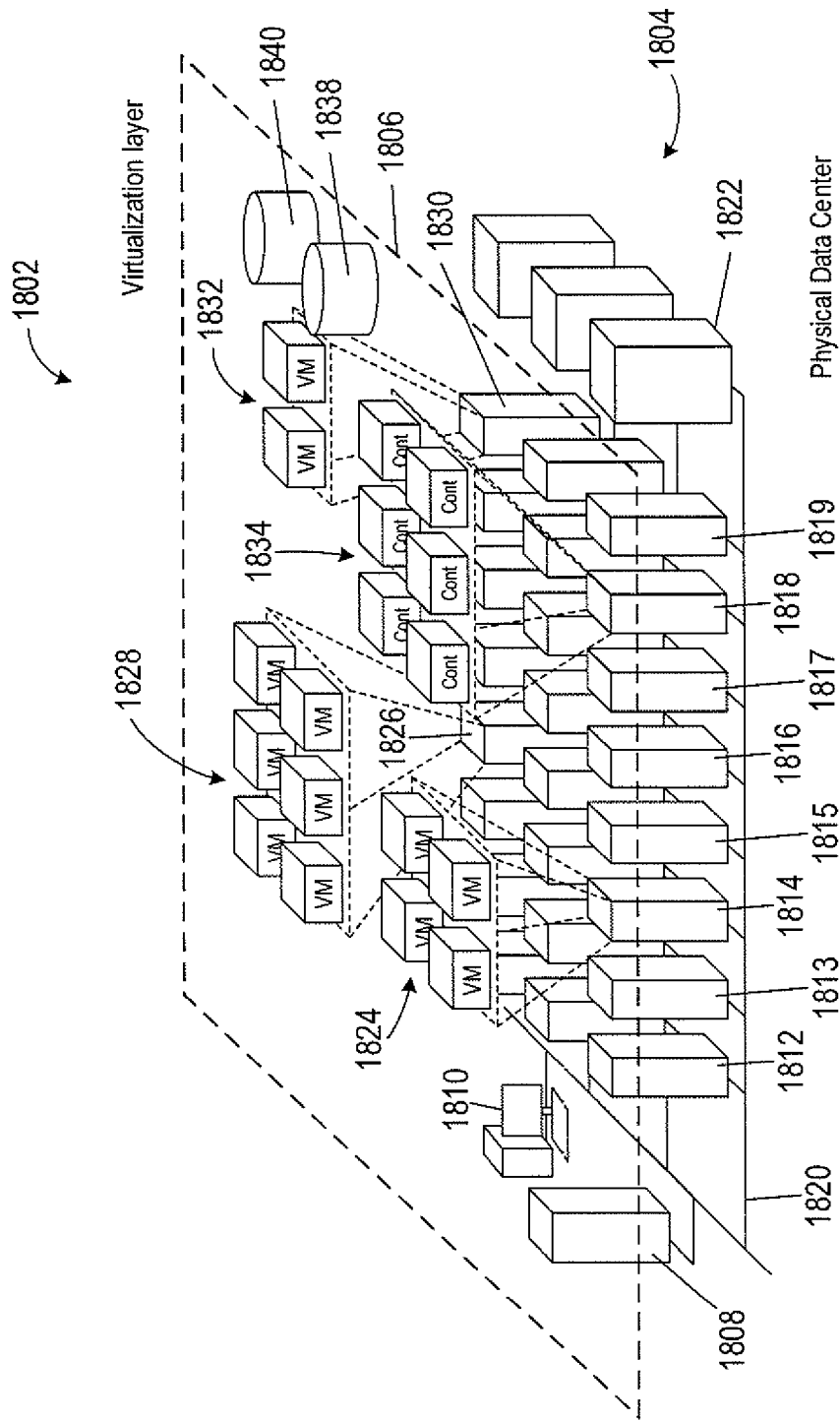
FIG. 18 shows an example of a virtualization layer located above a physical data center.

Methods to Adjust Resources and Monitoring Configuration of Objects in a Distributed Computing System FIG. 18 shows an example of a virtualization layer 1802 located above a physical data center 1804. The virtualization layer 1802 is separated from the physical data center 1804 by a virtual-interface place 1806. The physical data center 1804 comprises a management server computer 1808 and any of various different computers, such as PC 1810, on which a virtual-data-center management interface may be displayed to system administrators and other users. The physical data center 1804 additionally includes a number of server computers, such as server computers 1812-1819, that are coupled together by local area networks, such as local area network 1820, that directly interconnects server computers 1812-1819 and a mass-storage array 1822. The physical data center 1804 includes three local area networks that each directly interconnects a bank of eight server computers and a mass-storage array. Different physical data centers may include many different types of computers, networks, data-storage systems and devices connected according to many different types of connection topologies. The virtualization layer 1802 includes virtual objects, such as VMs and containers, hosted by the server computers in the physical data center 1804. Certain server computers host VMs as described above with reference to FIGS. 5A-5B. For example, server computer 1814 hosts four VMs 1824, server computer 1826 hosts six VMs 1828, and server computer 1830 hosts two VMs 1832. Other server computers may host containers as described above with reference to FIGS. 11 and 12. For example, server computer 1818 hosts six containers 1834. The virtual-interface plane 1806 abstracts the physical data center 1804 to one or more VDCs comprising the virtual objects and one or more virtual data stores, such as virtual data stores 1838 and 1840, and one or more virtual networks. For example, one VDC may comprise VMs 1828 and virtual data store 1838 and another VDC may comprise VMs 1824 and virtual data store 1840.

Figure 19A:
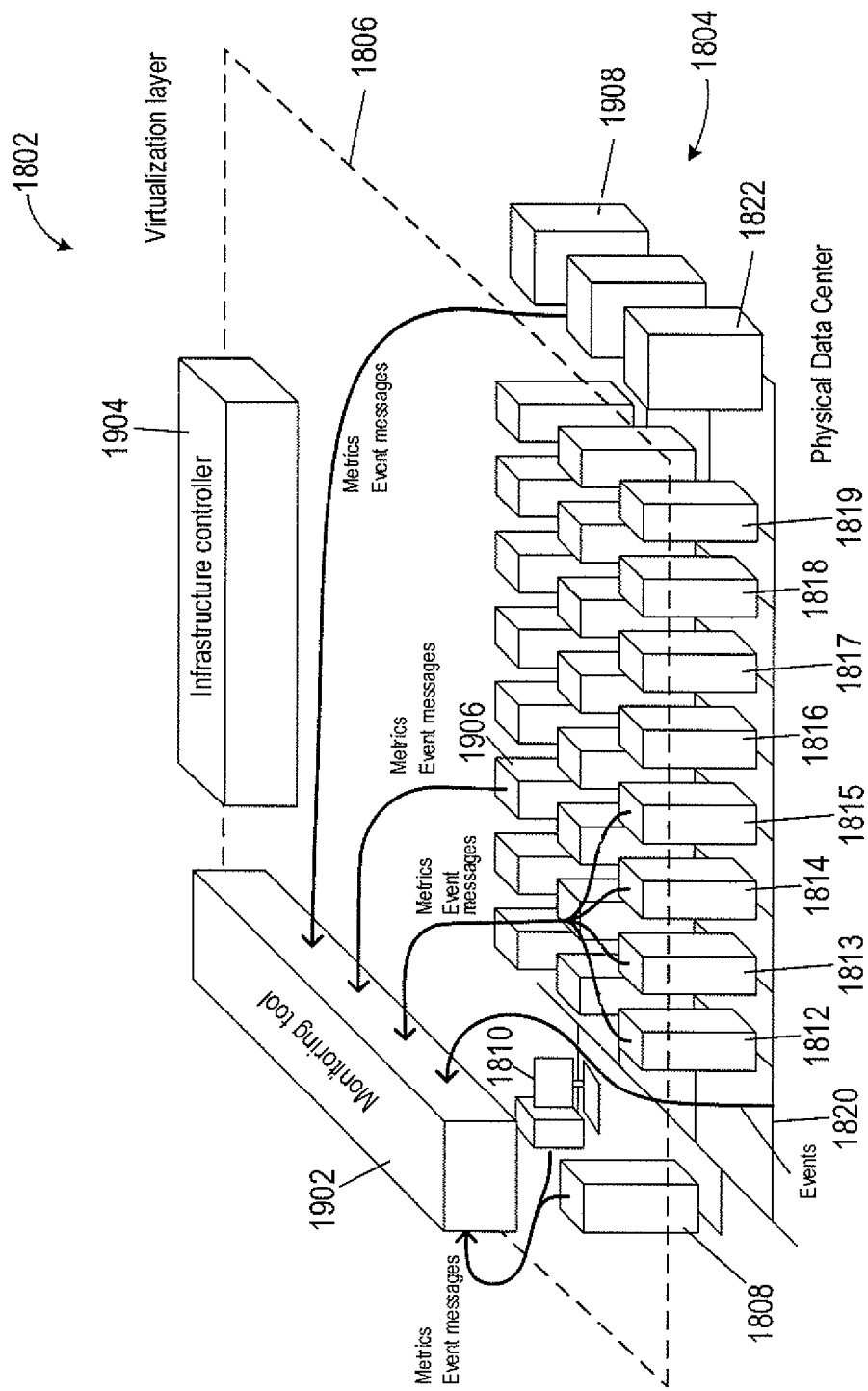
FIGS. 19A-19B show a monitoring tool and an infrastructure controller abstracted to a virtualization layer.
Figure 19B:
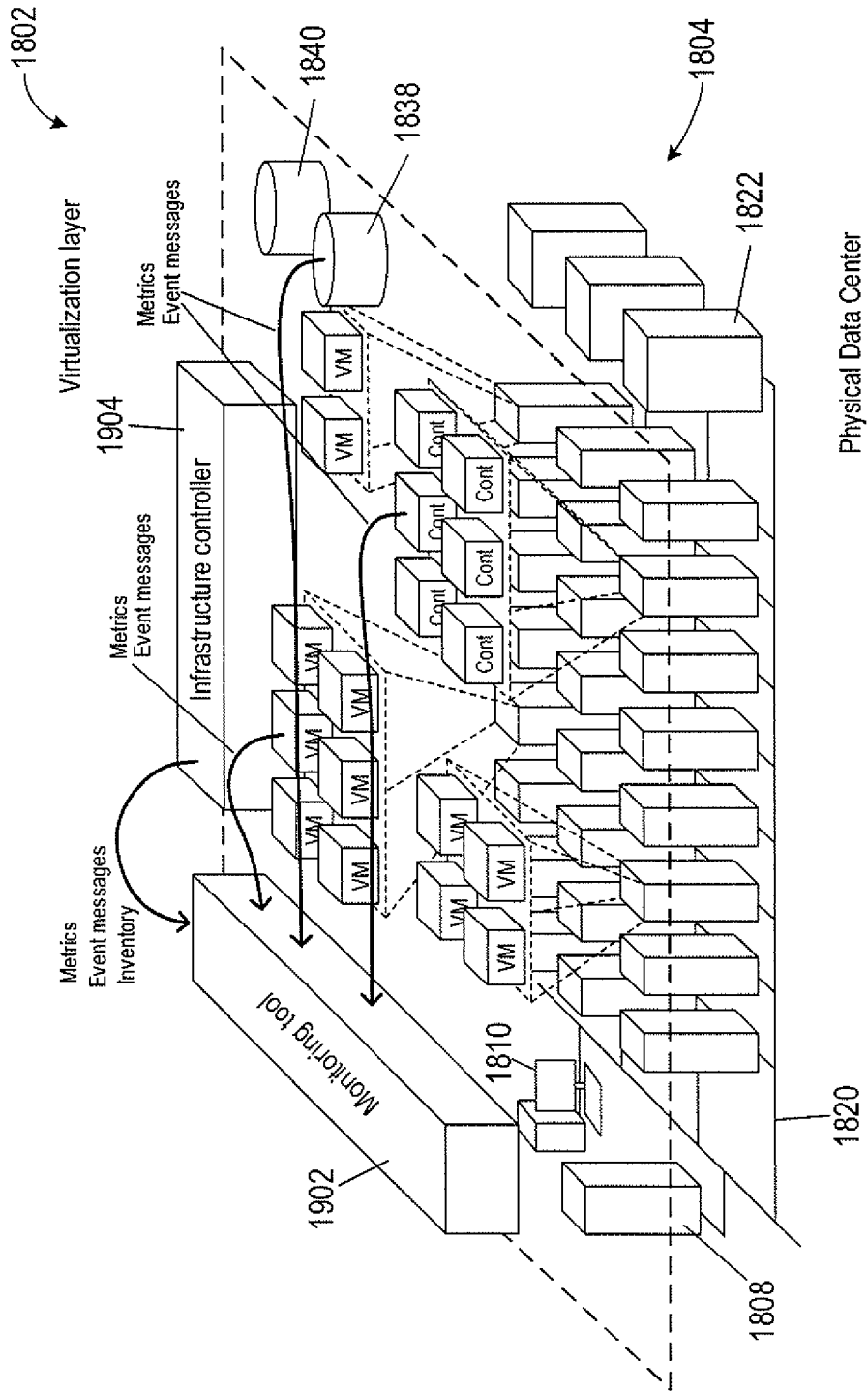

FIGS. 19A-19B show a monitoring tool 1902 and an infrastructure controller 1904 abstracted to the virtualization layer 1802. The monitoring tool 1902 and infrastructure controller 1904 are hosted by the management server computer 1808. The monitoring tool 1802 includes an information technology ("IT") operations management server, such as VMware's vRealize® Operations™, and a log management server. The IP operations management server monitors, usage, performance, and capacity of physical resources of each computer system, data-storage device, server computer and other components of the physical data center 1804. The physical resources include, but are not limited to, processors, memory, network connections, and storage of each computer system, mass-storage devices, and other components of the physical data center 1804. The IP operations management server monitors physical resources by collecting time series metric data, such as CPU usage, amount of memory, network throughput, network traffic, and amount of storage. CPU usage is a measure of CPU time used to process instructions of an application program or operating system as a percentage of CPU capacity. High CPU usage may be an indication of usually large demand for processing power, such as when an application program enters an infinite loop. Amount of memory is the amount of memory (e.g., GBs) a computer system uses at a given time. The log management server receives event messages sent by various log monitoring agents that run on the physical or virtual objects of the distributed computing system 1804 and receives event messages directly from event sources running on physical or virtual objects without log monitoring agents. The monitoring tool 1902 processes the metric data and the event messages and generates instructions to migrate VMs from one server computer to another in order to optimally or near optimally manage device allocation, provide fault tolerance, and high availability by migrating VMs to most effectively utilize underlying physical hardware devices, to replace VMs disabled by physical hardware problems and failures, and to ensure that multiple VMs supporting a high-availability virtual appliance are executed on multiple physical computer systems so that the services provided by the virtual appliance are continuously accessible, even when one of the multiple virtual appliances becomes compute bound, data-access bound, suspends execution, or fails. The log management server maintains event logs of the massive amounts of event messages generated by various VMs, containers, and operating systems running in the physical data center 1804.

As shown in FIGS. 19A-19B, directional arrows represent metric data and event messages sent from physical and virtual components of the physical data center 1804 to the monitoring tool 1902. In FIG. 19A, PC 1810, server computers 1808 and 1906, and mass-storage array 1908 send metric data and event messages to the monitoring tool 1902. Network events, such as network throughput and network traffic, of each component of the physical data center 1804 may also be sent to the monitoring tool 1902. Network throughput is the number of bits of data transmitted to and from a server computer or data-storage device and is often recorded in megabits, kilobits or simply bits per second. Network traffic at a server computer or mass-storage array is a count of the number of data packets received at and sent at a given time. Clusters of server computers may also send metric data and event messages to the monitoring tool 1902. For example, a cluster of server computers 1812-1815 sends cluster metric data and event messages to the monitoring tool 1902. In FIG. 19B, metric data and event messages are sent from the VMs, containers, and the infrastructure controller 1904 to the monitoring tool 1902. The infrastructure controller 1904 also sends metric data, event messages, an inventory and configuration of the physical resources of the physical data center 1804.

The monitoring tool 1902 uses the event messages and metric data to identify changes to existing VMs and containers by detecting each installation and removal of application programs and starting and stopping of services provided by application programs already running on VMs. The monitoring tool 1902 may also query any centralized repository for information regarding installation of application programs and changes to services. The centralized repository is a database component of the monitoring tool 1902 and is used to dynamically maintain a list of versions, revisions and configurations of each application program running in virtual objects of the distributed computing system. The centralized repository contains the application program name, version, configuration, source, and dependencies. The monitoring tool 1902 uses rules to determine an expected impact on resources and monitoring configurations of installing and removing a particular application program and starting and stopping services provided by existing application programs. The monitoring tool 1902 generates API commands that are sent to the infrastructure controller 1904 to execute appropriate action to accommodate changes that are expected to result from installing and removing the application program and starting and stopping the service. For example, when a service is enabled, such as restarting a previously available service or starting a new service, or an application program is installed, the monitoring tool 1902 identifies the service or application program in the centralized repository and determines resource allocation rules and the monitoring configuration rules associated with the service or application program. The monitoring configuration rules include a content pack that is used to monitor and analyze events generated by the service or application program. A content pack is a plugin to the monitoring tool 1902 that provides pre-defined information about specific types of events created by the application program or service, such as event messages. The content pack includes instructions to re-configure the monitoring configuration of a log monitoring agent (i.e., install log paths and log parser) of the server computer that runs the service or application program. With a content pack installed in the monitoring tool 1902 and the log monitoring agent re-configured to forward event messages to the monitoring tool 1902, the monitoring tool 1902 is able to monitor the application program log directories and event logs, parse application program event messages and extracts fields from event messages, such as httpd status codes, create dashboards to view the application program status, and generate alerts that notify a systems administrator about critical events and domain specific information about event logs. When a service is enabled or an application program is installed, the monitoring tool 1902 uses the resource allocation rules to determine expected changes in resource usage, such as expected increases in CPU usage, memory, and data storage. Based on the resource allocation rules, the monitoring tool 1902 generates API commands that are sent to the infrastructure controller 1904 to increase any one or more of CPU usage, memory, and data storage to accommodate the service or application program.

Figure 20:
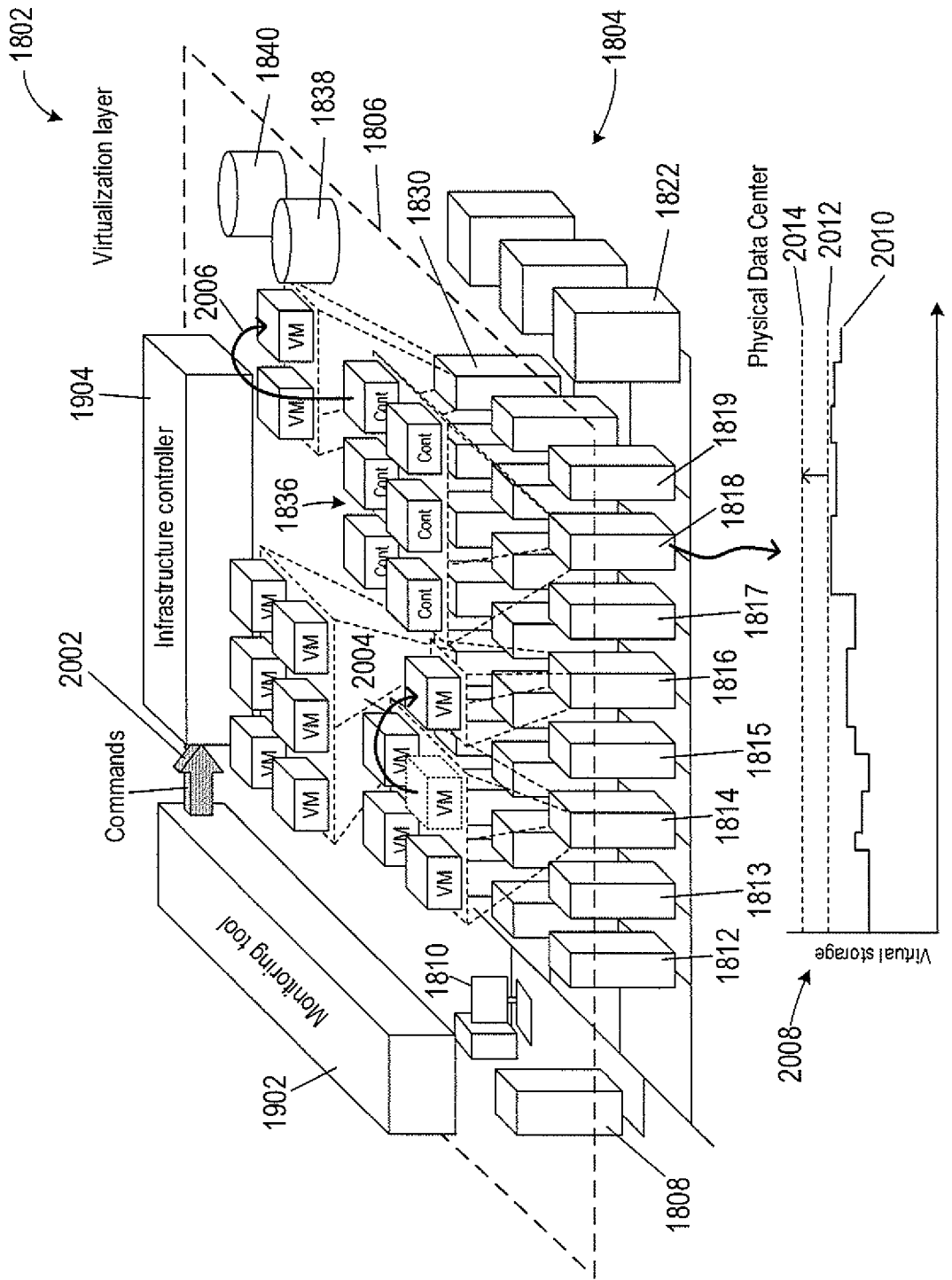
FIG. 20 shows a monitoring tool generates commands sent to an infrastructure controller in a virtualization layer.

FIG. 20 shows API commands 2002 sent from the monitoring tool 1902 to the infrastructure controller 1904. API commands 2002 include, but are not limited to, installing a content pack, moving hosts from one cluster to another cluster, migrating VMs from a server computer to another server compute, migrating a container to a VM, moving an application from a container to a VM, resizing virtual data storage, adjusting CPU usage by VMs, adjusting available memory for VMs, and adding network firewall rules between VMs. In the example of FIG. 20, the API commands 2002 include migrating 2004 a VM from the server computer 1814 to the server computer 1816 and migrating 2006 an application program from a container running on the server computer 1818 to a VM running in the server computer 1830. FIG. 20 also shows a plot 2008 of a virtual storage metric 2010 for a VM that stores data in the virtual data storage 1838. Dashed line 2012 represents the virtual storage limit. The monitoring tool 1902 may generate an API command that is sent to the infrastructure controller 1904 to increase the virtual storage limit 2012 to a new virtual storage limit 2014 in response to the virtual storage metric 2010 approaching the limit 2012.

The monitoring tool 1902 performs a search of recently received event messages for information that indicates potential changes in the demand for infrastructure resources of the distributed computing system. The information identified in the search includes, but is not limited to, a search for commands to "install" or "remove" an application program or "start," "stop," "enable," "disable," or "reconfigure" services provided by an application program. The monitoring tool 1902 accesses two databases of rules. The first database comprises resource allocation rules that represent the expected use of infrastructure resources by various application programs and various services provided by application programs. The resource allocation rules may also include a time component that indicates how quickly infrastructure resources should be scale up to accommodate the expected use of resources by the new application or service. A rule may have a numerical expected use parameter $X_r$ called a scaling rule and a corresponding time parameter $T_r$ called a timing rule, where the subscript "r" represents an infrastructure resource. For example, a rule regarding CPU usage by an application program or service may have an expected CPU usage denoted by $X_{CPU}$ and how quickly $T_{CPU}$ the CPU usage $X_{CPU}$ is reached. Other rules include, but are not limited to, an amount of data storage an application program or service is expected to use $X_{DS}$ and how quickly $T_{DS}$ the amount of data storage $X_{DS}$ is reached; an amount of memory an application program or service is expected to use $X_M$ and how quickly $T_M$ the amount of memory $X_M$ is reached; an amount of network traffic per unit of time an application program or service is expected to create $X_{NT}$ and how quickly $T_{NT}$ the amount of network traffic $X_{NT}$ is reached; and a number of event messages per unit time an application program or service is expected to create $X_{EM}$ and how quickly $T_{EM}$ the number event messages $X_{EM}$ is reached. The second database comprises monitoring configuration rules. A monitoring configuration rule includes content packs. A single content pack comprises one or more log paths for forwarding event messages from event source, one or more log parsers to process the log messages before sending to the monitoring tool, and may include script files to run and prepare event logs maintained by the monitoring tool 1902. The content pack also includes monitoring configuration changes for the monitoring tool 1902 such as changes in maintaining log directories and event logs, parsing application program event messages and extracting fields from event messages, creating dashboards to view the application program status, and generating alerts that can be used to notify a systems administrator about critical events and domain specific information about an event. The rules in the two different databases may be provided by the application program vendor or manually entered by administrators who measured the previous impact of the application program or services on infrastructure resources.

The monitoring tool 1902 searches the databases of rules and identifies the rule or rules that corresponds to the application program or service and to the command applied to the application program or service. For example, certain application programs require a content pack but no resource changes because the current resources are sufficient. On the other hand, other application programs require additional resources but not a content pack, because the content pack that was previously installed for the first instance of the application program and second instance's event logs have the same directory event log paths as the first instance event logs. The command and the application program or service are identified in an event message or queried from a centralized software/configuration repository or management service. The resource allocation rules are used to determine the expected impact installing or uninstalling an application program, starting a service provided by an application program, removing or stopping an application program, or reconfiguring an application program will have on the distributing computing resources. The monitoring configuration rules are used to determine the expected configuration of log paths, log parsers, and content packs that will have to applied to accommodate the application program and services.

In certain implementations, the expect impact on resources may be determined by thresholds associated with each infrastructure resource. Consider a quantity, $X_{r,cur}$, that represents the amount of an infrastructure resource "r" currently in use by other application programs or services provided by an application program. A threshold, $th_r$, represents an acceptable threshold for using the infrastructure resource. The expected impact on the resource r by installing the application program or starting the services may be computed as follows:

$$\text{Expected Impact} = X_r + X_{r,cur} \quad (1)$$

When the following condition is satisfied $$X_r + X_{r,cur} < th_r \quad (2)$$

the expected impact of the installed application program or services on the infrastructure resource r is not considered a problem. On the other hand, when the following condition is satisfied for the infrastructure resource, $$X_r + X_{r,cur} \geq th_r \quad (3)$$

an alert may be generated indicating that the installed application program or started services are expected to use more of the infrastructure resource r than is acceptable.

In other implementations, the expected impacts may be determined as percentages of capacity of infrastructure resources that are expected to be used by a new application program or started services. A percentage of infrastructure resources a new application program is expected to use may calculated as follows:

$$P(X_r) = X_r / X_{r,cap} \times 100 \quad (4)$$

where $X_{r,cap}$ is the capacity of the infrastructure resource r. Consider a threshold $Th_r$ (i.e., $Th_r \leq 100$) that represents an acceptable threshold for using of the infrastructure resource. The expected impact may be computed as follows:

$$\text{Expected Impact} = P(X_r) + P(X_{r,cur}) \quad (5)$$

When the following condition is satisfied $$P(X_r) + P(X_{r,cur}) < Th_r \quad (6)$$

the expected impact of the installed application program or services on the infrastructure resource is not considered a problem. On the other hand, when the following condition is satisfied for at least one of the infrastructure resources, $$P(X_r) + P(X_{r,cur}) \geq Th_r \quad (7)$$

an alert may be generated indicating that the installed application program or started services are expected to use more of the infrastructure resource r than is acceptable.

For example, suppose a server computer has 100 GB of memory capacity, a threshold of 90%, and 70 GB (i.e., 70%) of the memory is currently in use. A new application program added to a VM running on the server computer is expected to have memory usage of 10 GB (i.e., 10%). The expected impact would be 80 GB (i.e., 80%), which is less than the 90% threshold. As a result, no adjustments are made to accommodate the new application program. On the other hand, suppose the new application program added to the VM is expected to have a memory usage of 25 GB. The expected impact would be 95 GB (i.e., 95%), which is greater than the threshold. As a result, adjustments are made to accommodate the new application program, such as migrating the VM to another server computer.

Depending on the type of infrastructure resources impacted, the monitoring tool 1902 may generate commands to adjust the availability of the infrastructure resource to accommodate the expected impact of the application program or increased services. For example, the monitoring tool 1902 may allocate additional CPU or memory of the server computer to the VM or container used to run the new application program or the started services. Alternatively, the monitoring tool 1902 may generate instructions to migrate the VM to a different server computer with a larger amount of available resources.

Figure 23A:
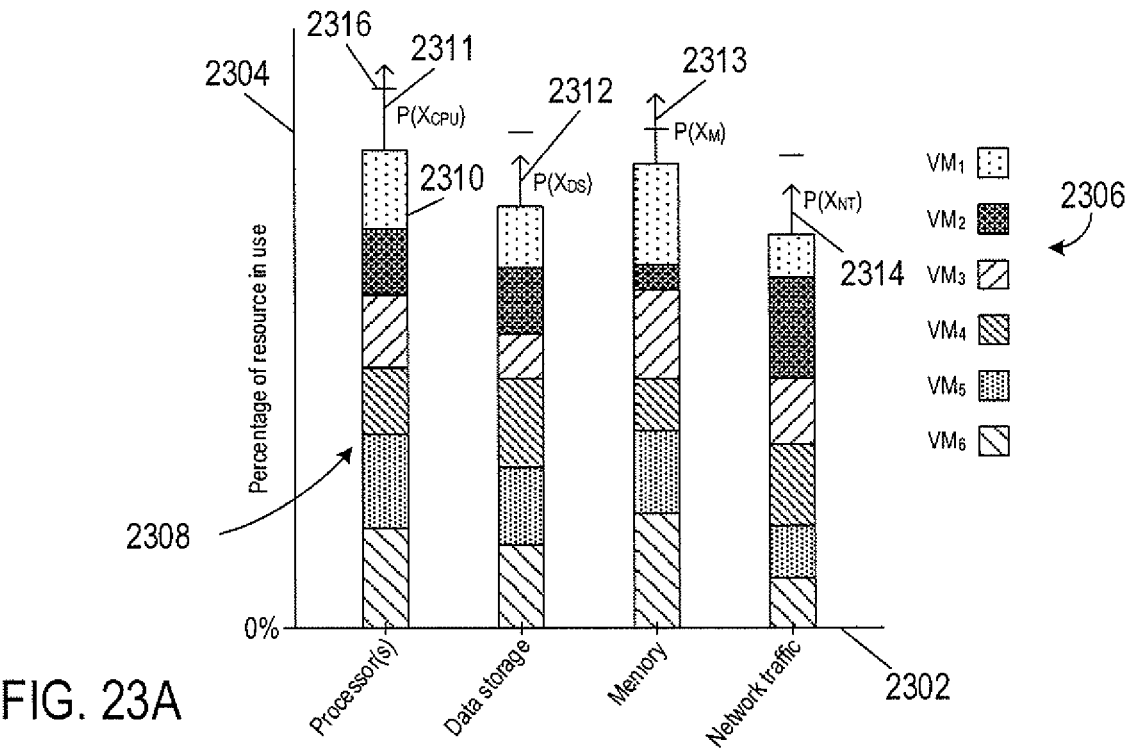
FIG. 23A shows a stacked bar chart of operational data.
Figure 23B:
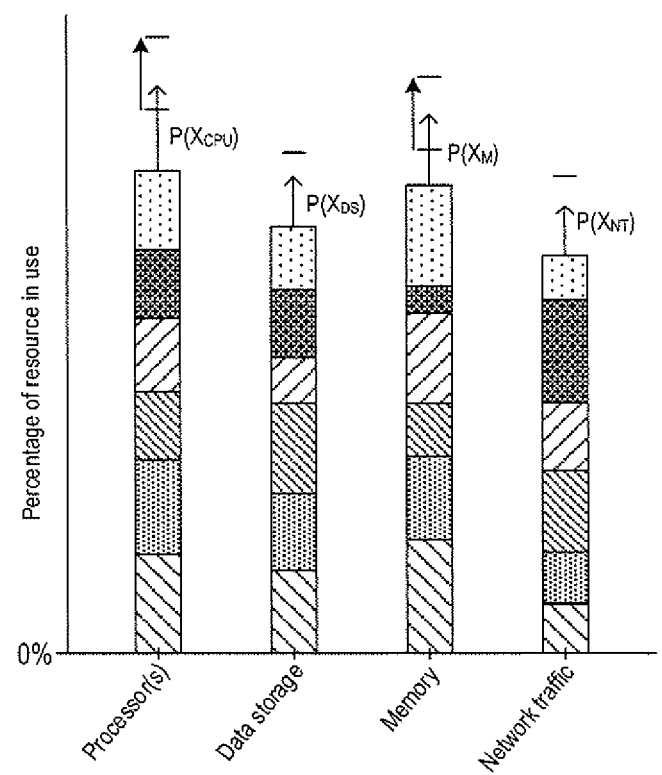
FIG. 23B shows a stacked bar chart of operational data.
Figure 24:
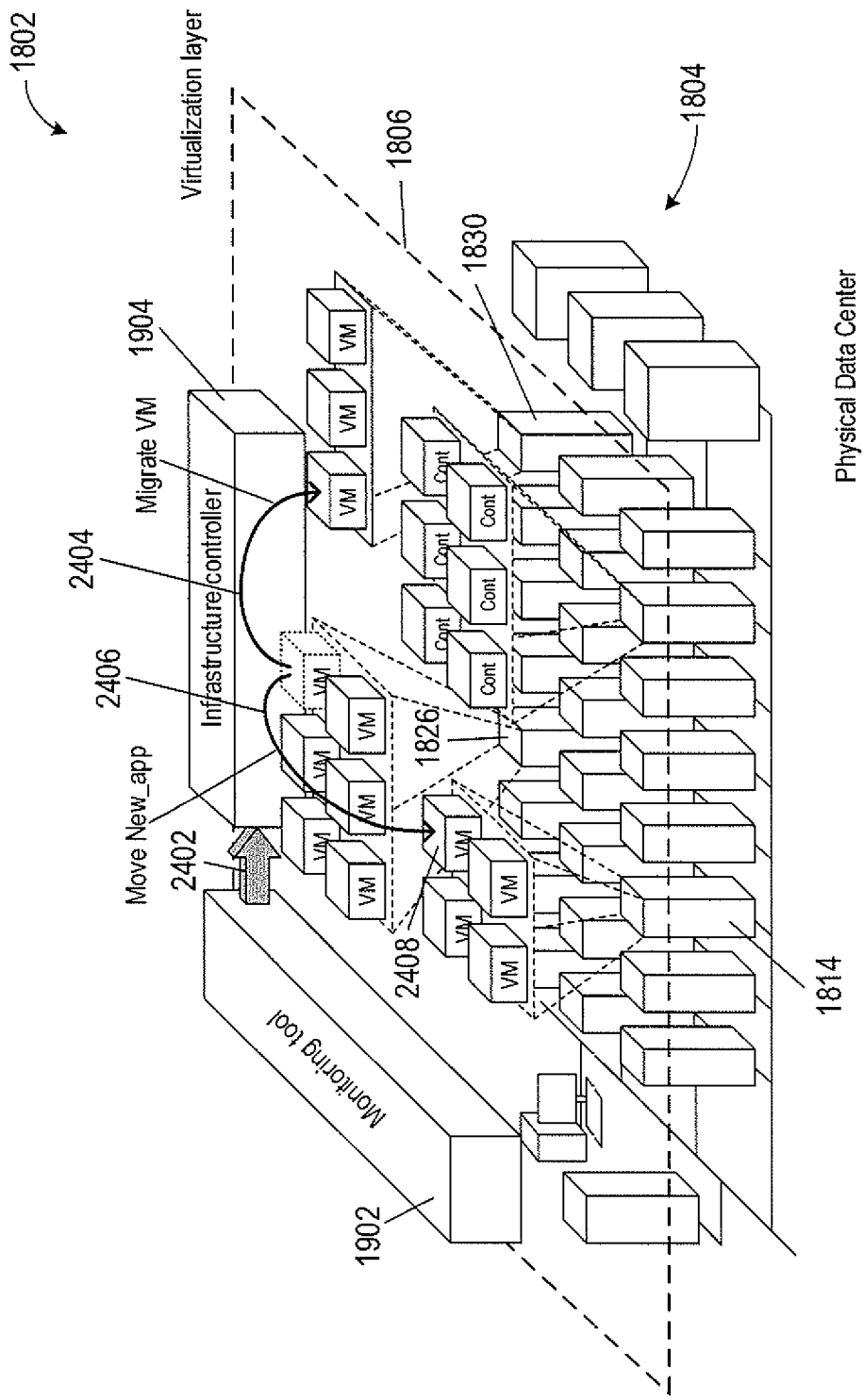
FIG. 24 shows a monitoring tool that generates a command sent to an infrastructure controller to migrate a VM.
Figure 25:
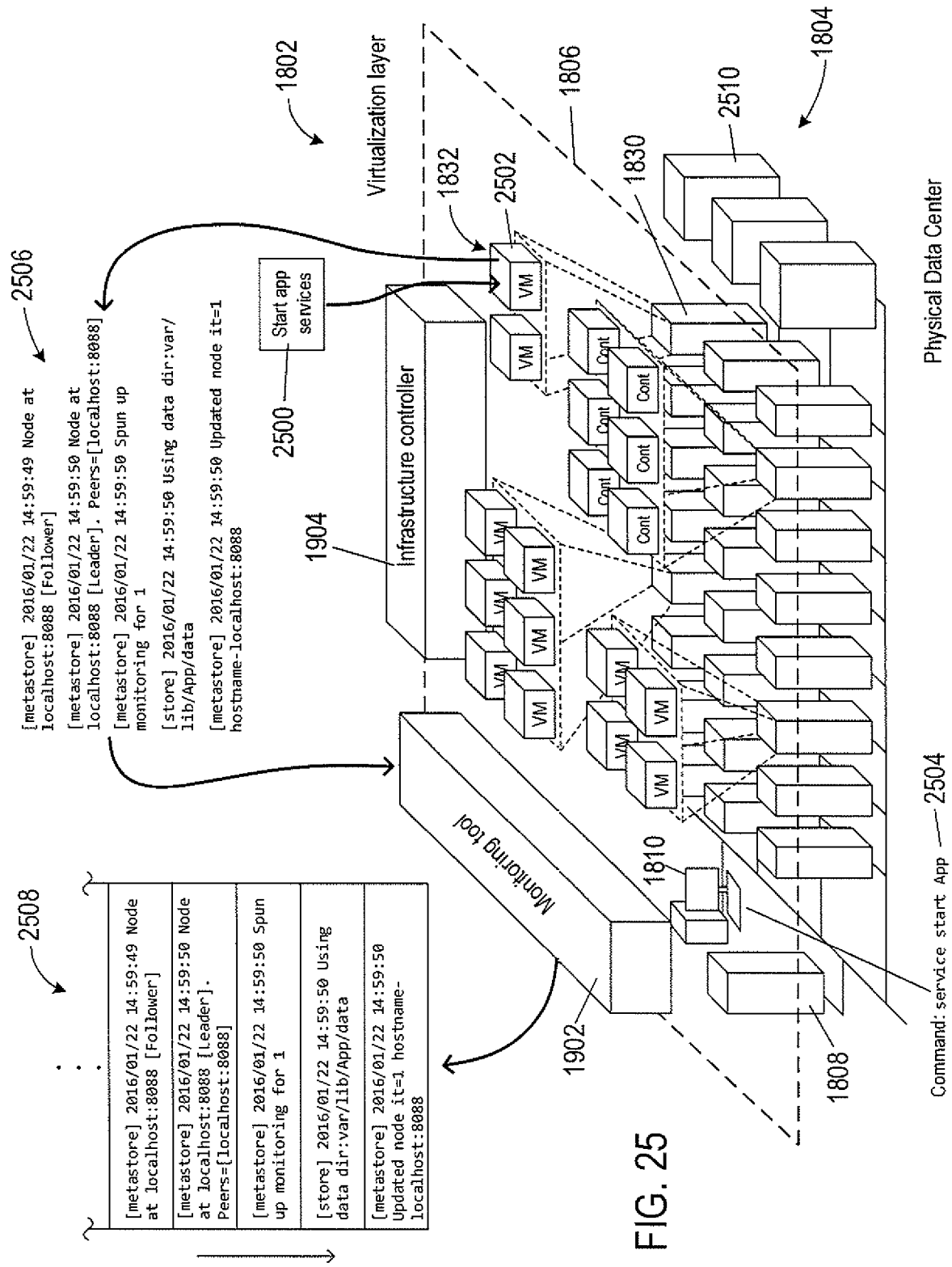
FIG. 25 shows an example of starting services provided by an application program.
Figure 26:
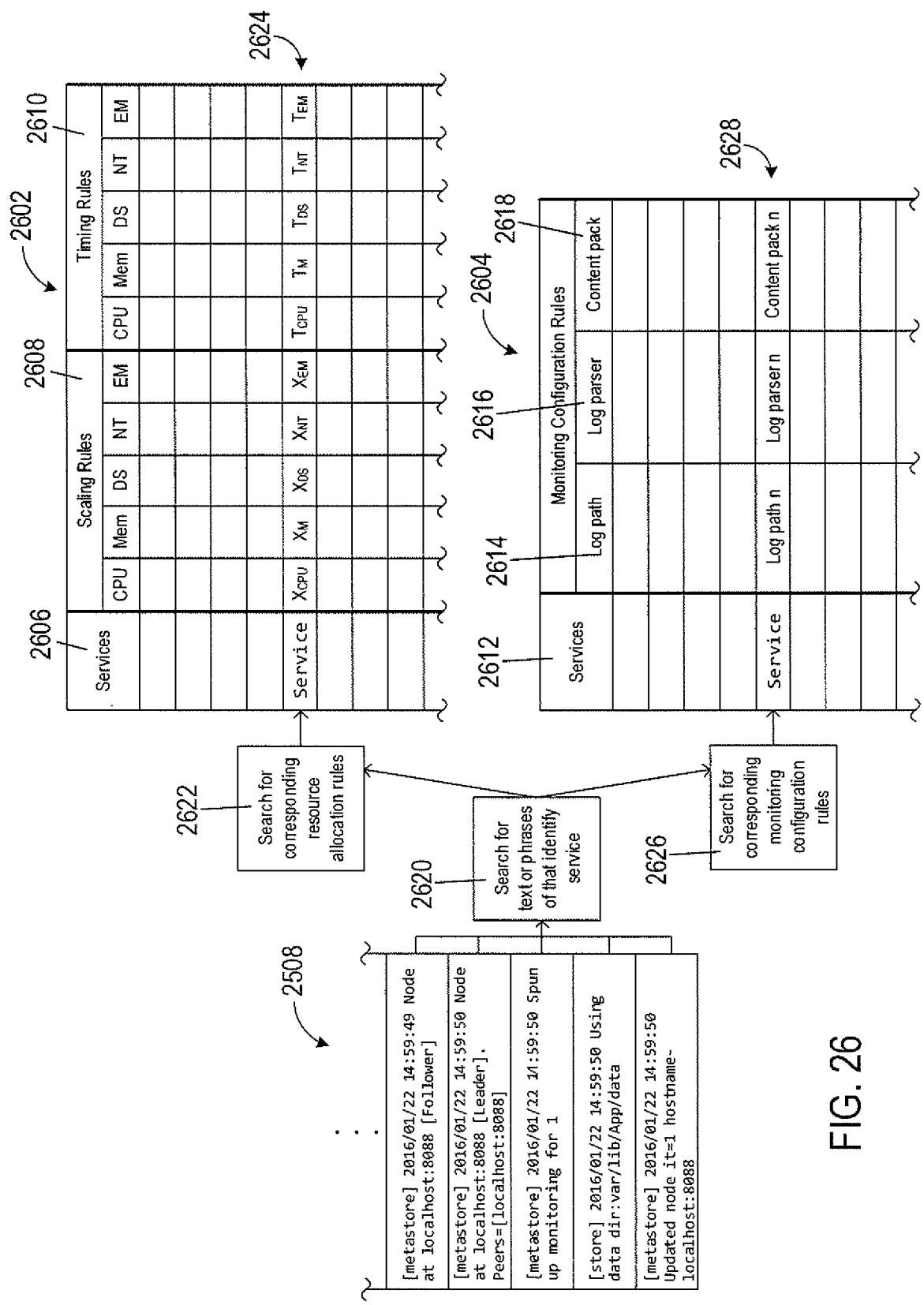
FIG. 26 shows an example of contents of a database of services resource allocation rules and contents of a database of services monitoring configuration rules.

FIGS. 21-24 show an example of determining an expected impact on resources and determining an expected monitoring configuration that results from installing an application program on a VM. FIGS. 25-27 show an example of determining an expect impact on resources and determining an expected monitoring configuration that result from starting services provided by an existing application program.

Figure 21:
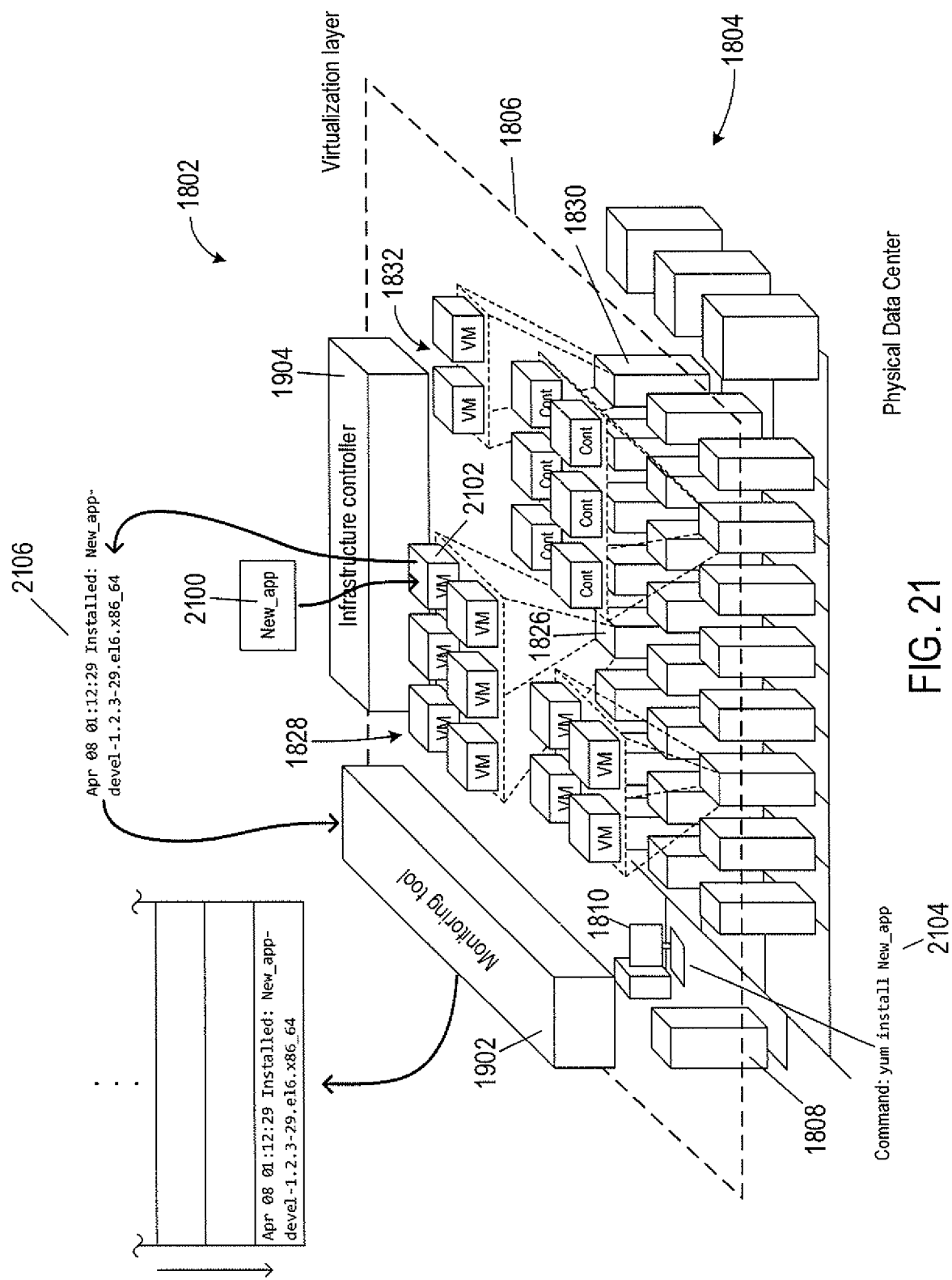
FIG. 21 shows an example of installing an application program in a VM on a server computer.

FIG. 21 shows an example of installing an application program 2100 named "New_app" in an existing VM 2102 running on the server computer 1826 in the physical data center 1804. A system administrator may install the new application program 2100 by entering the command "yum install New_app" 2104 at the administration PC 1810. The command "yum" is an example of a command for installing application programs in certain operating systems. Other operating system may use different commands for installing application programs. When the new application program 2100 is installed in the VM 2102, an event message 2106 is generated and sent to the monitoring tool 1902 stating the date and time the application program identified as "New_app" was installed on the server computer 1826. The monitoring tool 1902 writes the event message 2106 to an event log 2108 that records event messages regarding installations of application programs. The event message 2106 may be recorded in an installation event log 2108 of the management server computer 1808. For example, the installation event log 2108 may be identified as "yum.log" and stored in a log directory of the management server computer 1808 as "/var/log/yum.log."

Figure 22:
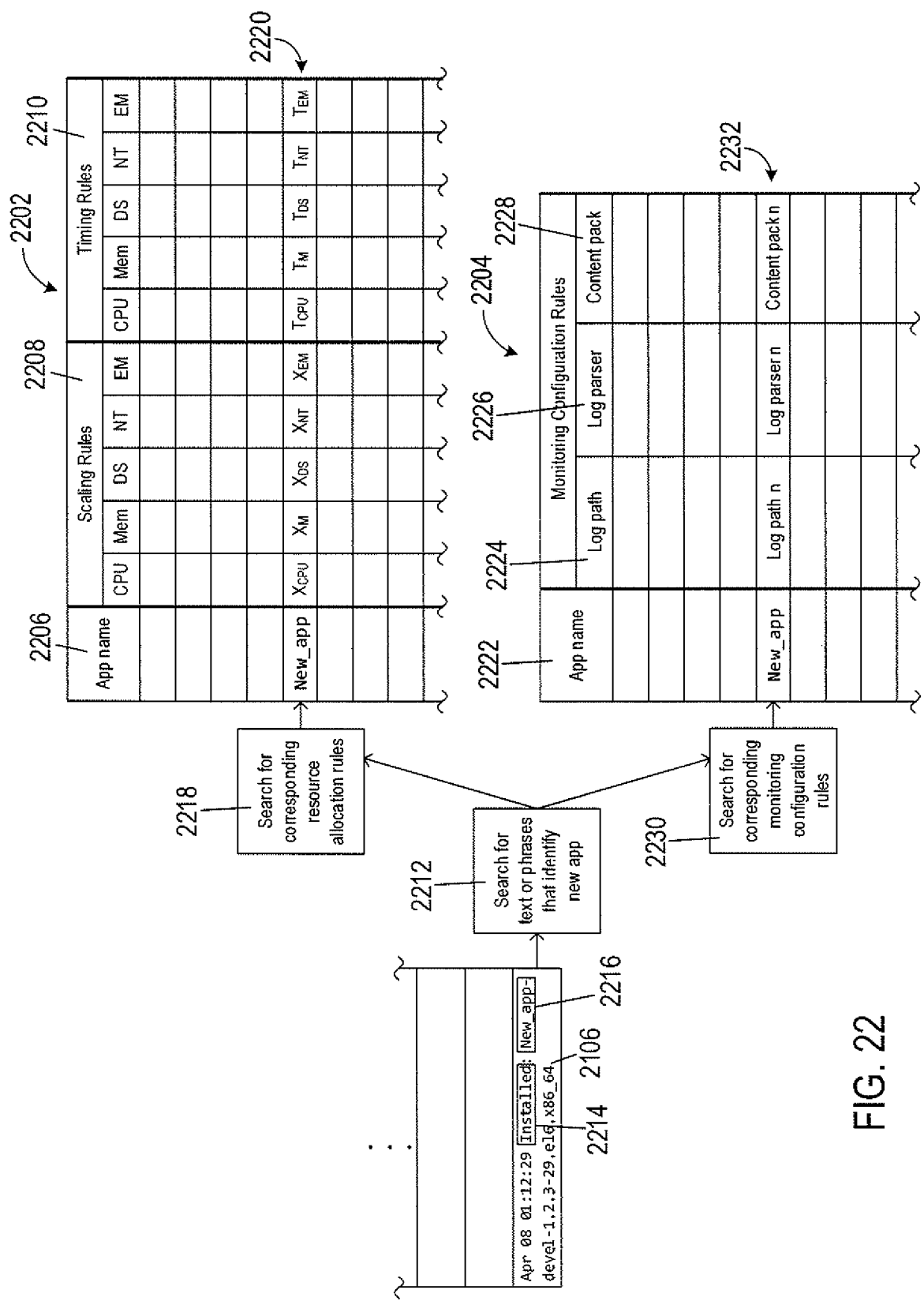
FIG. 22 shows an example of a contents of a database of resource allocation rules and contents of a database of monitoring configuration rules.

FIG. 22 shows an example of a contents of database of application resource allocation rules 2202 and contents of a database of monitoring configuration rules 2204. In this example, the resource allocation rules 2202 contains a list of application names 2206 and corresponding scaling rules 2208 and timing rules 2210. The scaling rules 2208 are denoted $X_{CPU}$, $X_M$, $X_{DS}$, $X_{NT}$, and $X_{EM}$. The timing rules 2210 are denoted by $T_{CPU}$, $T_M$, $T_{DS}$, $T_{NT}$, and $T_{EM}$ and correspond to the scaling rules and indicate how much time is expected to pass before the quantities represented by the scaling rules will be reached. The monitoring tool 1902 performs a search 2212 on the event message 2106 for information text, words, or phrases that indicate an application program has been installed and the name of the application program. In this example, the search 2212 identifies the term "installed" 2214 followed by the name "New_app" 2216 of the new application program 2100. The name of the application program "New_app" is used to search 2218 the resource allocation rules for the rules 2220 associated with the "New_app." The monitoring tool 1902 uses the rules 2220 to determine the expected impact of the application program on infrastructure resources as described above with reference to Equations (1)-(5). The monitoring configuration rules 2204 contains a list of application names 2222 and corresponding lists of log paths 2224, log parses 2226, and content packs 2228, as described above. The name of the application program "New_app" is also used to search 2230 the monitoring configuration rules 2204 for the monitoring configuration rule 2232 associated with the "New_app." The rule 2232 is the expected monitoring configuration comprising a "content pack n" that is plugged into the monitoring tool 1902 and corresponding log path n and log parse n that are added to the log monitoring agent of the server computer 1826 that runs the application program "New_app" 2100. The log path n and log parse n forward event messages generated by the application program 2100 to the monitoring tool 1902. Note that when the server computer 1826 does not have a log monitoring agent, the monitoring tool 1902 can still use the content pack's capabilities (e.g., recognizing fields from received raw event messages) to analyze and react to events received without using a log monitoring agent.

FIG. 23A shows a stacked bar chart of operational data for the infrastructure resources used by the six VMs 1828 shown in FIG. 21. Horizontal axis 2302 list the four resources: processor(s), data storage, memory, and network connection. Vertical axis 2304 represents percentage of each resource in use. FIG. 23A includes a legend 2306 that list the six VMs 1828 identified as $VM_1$, $VM_2$, $VM_3$, $VM_4$, $VM_5$, and $VM_6$ and differently shaded boxes identify the six VMs in the stacked bar chart. The total length of each bar represents the percentage of the infrastructure resource currently in use by all six of the VMs. The length of each differently shaded segment in a bar represents the percentage of the infrastructure resource in use by the corresponding VM. For example, the length of processor(s) bar 2308 represents the percentage of the processor(s) of the server computer 1826 currently used by the six VMs 1828 and the length of shaded segment 2310 represents the percentage of the processor(s) currently used by $VM_1$. Arrows 2311-2314 located at the top of each bar represents the expected impact the new application program 2100 running in the VM 2102 will have on processor(s), data storage, memory, and network traffic. Line segments, such as line segment 2316, represent acceptable thresholds for each of the infrastructure resources. As shown in FIG. 23, the processor usage and memory are expected to exceed the associated thresholds, which triggers an alert indicating that the new application program 2100 will overload the processor(s) and memory of the server computer 1826. The monitoring tool 1902 adjust process(s) and memory allocation of the server computer 1826 to accommodate the expect increase in usages. FIG. 23B shows a plot of the stacked bar chart shown in FIG. 23A with the thresholds for the processor(s) and memory corresponding to the additional allocation of processor(s) and memory to the VM 2102 running the new application program.

On the other hand, if the resources of the server computer 1826 cannot be adjusted to accommodate the demand by the new application program, the monitoring tool 1902 may search for a server computer that can accommodate the new application program 2100 or the VM 2102. FIG. 24 shows the monitoring tool 1902 generates a command 2402 sent to the infrastructure controller 1904 to migrate 2404 the VM 2102 from the server computer 1826 to the server computer 1830. The infrastructure controller API executes the process of migrating 2404 the VM 2102 from the server computer 1826 to the server computer 1830 and installing the VM 2102 and new application program 2100 on the server computer 1830. FIG. 24 also shows the monitoring tool 1902 generates a command 2402 to move 2406 the new application program to a VM 2408 running in the different server computer 1814.

FIG. 25 shows an example of starting services 2500 provided by an application program named "App" of a VM 2502 located on the server computer 1830. A system administrator may start the services by entering the command "service start App" 2504 at the administration PC 1810. The command "service start" is an example of a command for starting application programs in certain operating systems. Other operating systems use different commands for starting services application programs. When the services begin, the application program and guest operating system of the VM 2502 generate one or more event messages 2506 that are sent to the monitoring tool 1902. The monitoring tool 1902 writes the event message 2506 to an application specific event log 2508. For example, the application specific event log 2508 may be identified as "App.log" and stored in a log directory of the management server computer 1808 for the application program as "/var/log/App/App.log."

Examples of services that increase demand for infrastructure resources include, but are not limited to, ad [authentication], dns [hostname resolution], ntp [time synchronization], smtp [email], and http proxy [web traffic]. The monitoring tool 1902 accesses rules associated with the services provided by an application program in order to determine the expected impact the services may have on the infrastructure resources. The rules may be stored in a database in the management server computer 1808 and accessed by the monitoring tool 1902 in response to identifying the services provided by the application program in one or more of the events messages 2506.

FIG. 26 shows an example of contents of a database of services resource allocation rules 2602 and contents of a database of services monitoring configuration rules 2604. In this example, the service resource allocation rules 2602 contains a list of services 2606 and corresponding scaling rules 2608 and associate timing rules 2610. The services monitoring configuration 2604 contains a list of services 2612 and corresponding log paths 2614, log parses 2616, and content packs 2618. A search 2620 is performed on the one or more event messages 2506 recorded in the event log 2508 for information that identifies the services 2500. The results are used to search 2622 the services resource allocation rules 2602 for the expect resource allocation rules 2624 associated with the service. The rules 2624 are used to determine the expected impact of the services 2612 on infrastructure resources as described above with reference to Equations (1)-(5). The results are used to perform a separate search 2626 of the services monitoring configuration rules 2604 for the rule 2628 associated with the service. The rule 2628 is the expected monitoring configuration comprising a "content pack n" that is plugged into the monitoring tool 1902 and the corresponding log path n and log parse n that are added to the log monitoring agent of the server computer 1830 that runs the services. The log path n and log parse n forward event messages generated by running the services to the monitoring tool 1902

Figure 27A:
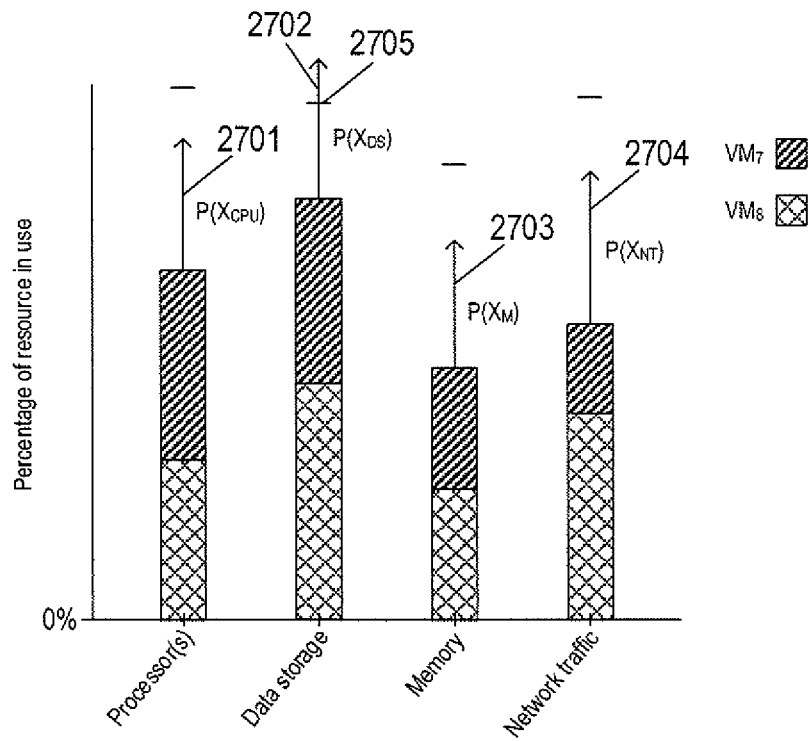
FIG. 27A shows a stacked bar chart of operational data.
Figure 27B:
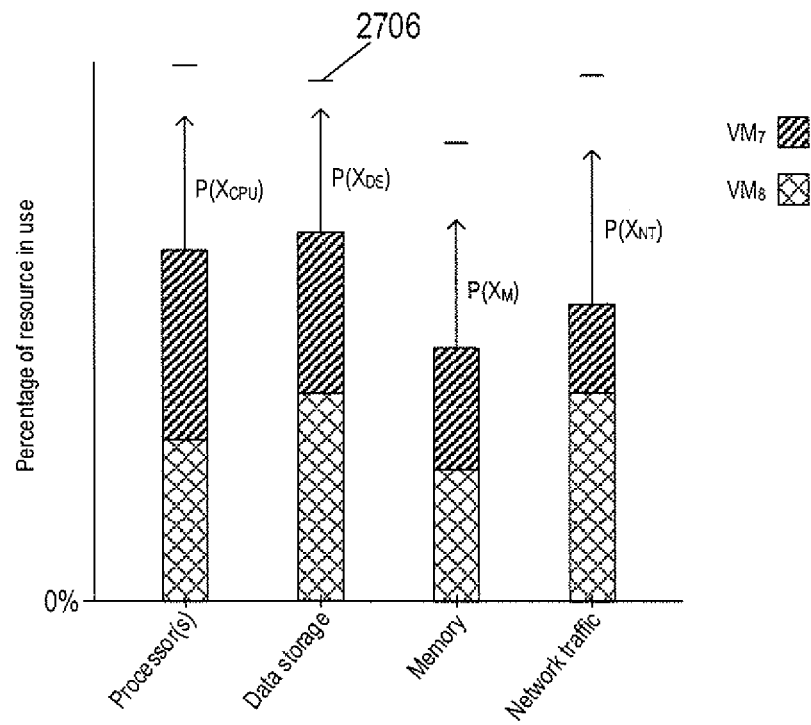
FIG. 27B shows a stacked bar chart of operational data.

FIG. 27A shows a stacked bar chart of operational data of the infrastructure resources used by the two VMs 1832. Arrows 2701-2704 located at the top of each bar represents the expected impact the services provided by the application program will have on processor(s), data storage, memory, and network traffic. As shown in FIG. 27A, while the expected impact to the processor(s), memory, and network traffic are acceptable, the data storage requirements are expected to exceed the data storage threshold 2705. An alert may be generated indicating that the data storage will be exceeded by the new services. The monitoring tool 1902 may then allocate more storage in a mass-storage device 2510 used by the server computer 1830 in FIG. 25. FIG. 27B shows a stacked bar chart of operational data of the infrastructure resources used by the two VMs 1832 after allocation of additional data storage. The expected impact on the data storage is below a new storage threshold 2706. A notice may be displayed on the management interface of the PC 1810 indicating to the system administrator and other users of the change in data storage.

The monitoring tool 1902 also searches event messages that identify when an application program has been removed, stopped or reconfigured, which results in using fewer infrastructure resources. The monitoring tool 1902 determines that the infrastructure resources are available and generates API commands sent to the infrastructure controller 1904 to put the available infrastructure resources to use by other VMs, containers, application programs and services in order to accommodate the expected impacts described above.

The sets of rules describe above with reference to FIGS. 22 and 26 may be obtained from application program vendors or from a system administrator that manually enters the rules based on observing the demand for infrastructure resources when the application program or services were executed in the past. Alternatively, when no rules are available for a new application program or for services, the application program may be installed and executed, or the services provided by an application program may be started, and the monitoring tool 1902 collects and maintains a record of how much usage of the infrastructure resources change based on the metric data received and increases in network traffic and event messages.

Figure 28:
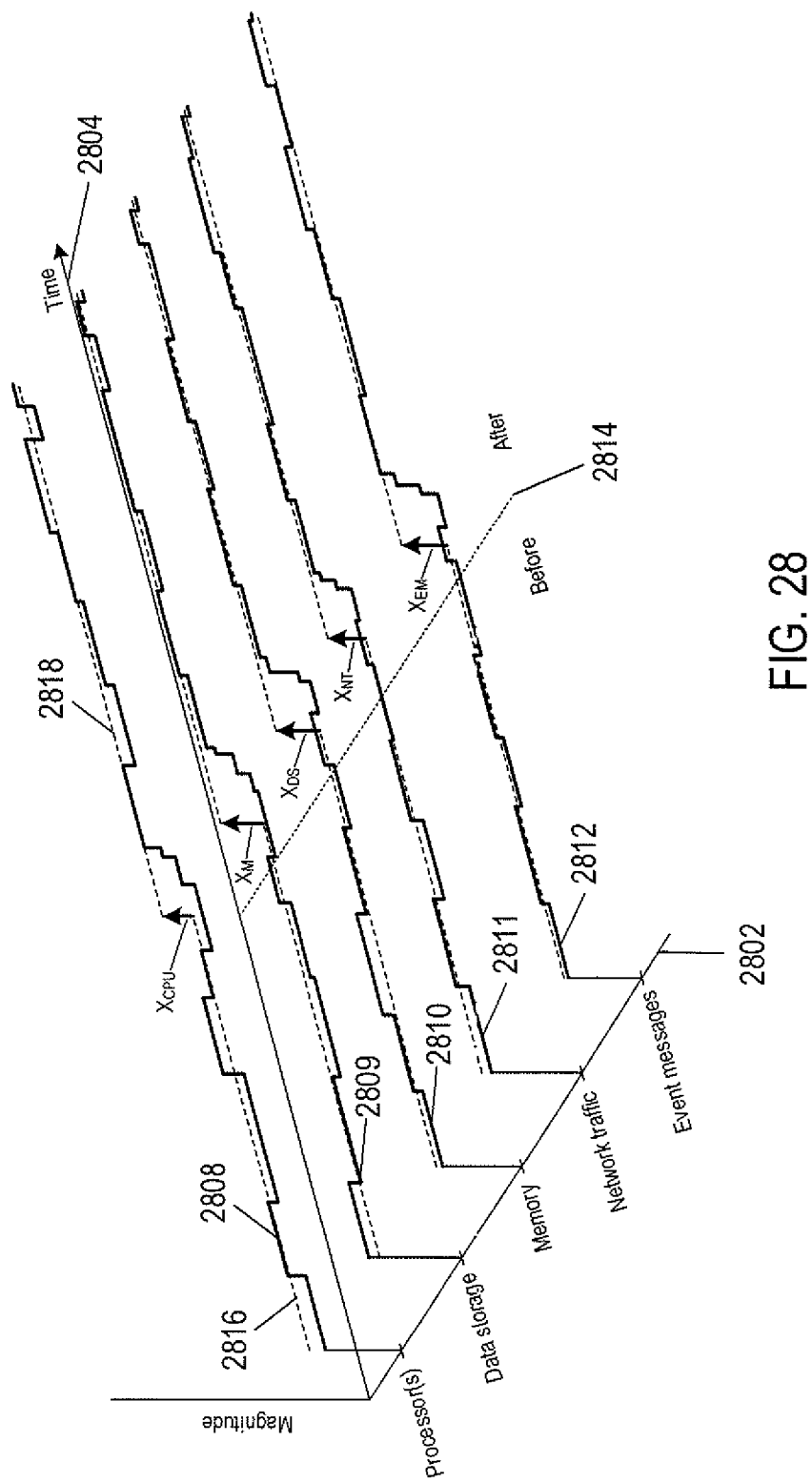
FIG. 28 shows operational data collected for processor(s), data storage, memory, network traffic, and event messages.

FIG. 28 shows operational rata collected for processor(s), data storage, memory, network traffic, and event messages associated with starting new services or installing an application program in a virtual object, such as a VM or container. Axis 2802 list the processor(s), data storage, memory, network traffic, and event messages. Axis 2804 represents time. Axis 2806 represents the magnitude of the different categories of operational data. Curves 2808-2812 represent metric data collected for the different categories of operation data. Curve 2808 represents total CPU usage for one or more processors of the server computer. Curve 2809 represents the amount of data storage used by the application program. Curve 2810 represents the amount of memory in use at the server computer. Curve 2811 represents the network traffic at the server computer. Curve 2812 represents the number of event messages generated by the virtual object. Dotted line 2814 marks the time when the new services provided by the application program running in the virtual object are started. The application program is allowed to run for a period of time in order to collect operational data for each of the different categories. Dashed lines, such as dashed line 2816, represent the average of each metric collected in a time interval before the new service started or installation of application program. Dashed lines, such as dashed line 2818, represent the average of the operation data collected in a time interval after the new service started or installation of application program. A rule may be calculated as a difference between the average of the metric data collected before and after the start of the services:

$$X_r = \mathrm{ave}\_X_{r,before} - \mathrm{ave}\_X_{r,after} \qquad (8)$$

where $\mathrm{ave}\_X_{r,before}$ is the average of metric data of the resource r collected in a time interval before the new service started or installation of the application program; and $\mathrm{ave}\_X_{r,after}$ is the average of the metric data associated of the resource r collected in time interval after the new service started or installation of the application program.

The rule may be added to the set of rules for the services as described above with reference to FIG. 26A.

The method described below with reference to FIGS. 29-33 may be stored in one or more data-storage devices as machine-readable instructions that when executed by one or more processors of the computer system shown in FIG. 1 to adjust resources and monitoring configuration of objects in a distributed computing system.

Figure 29:
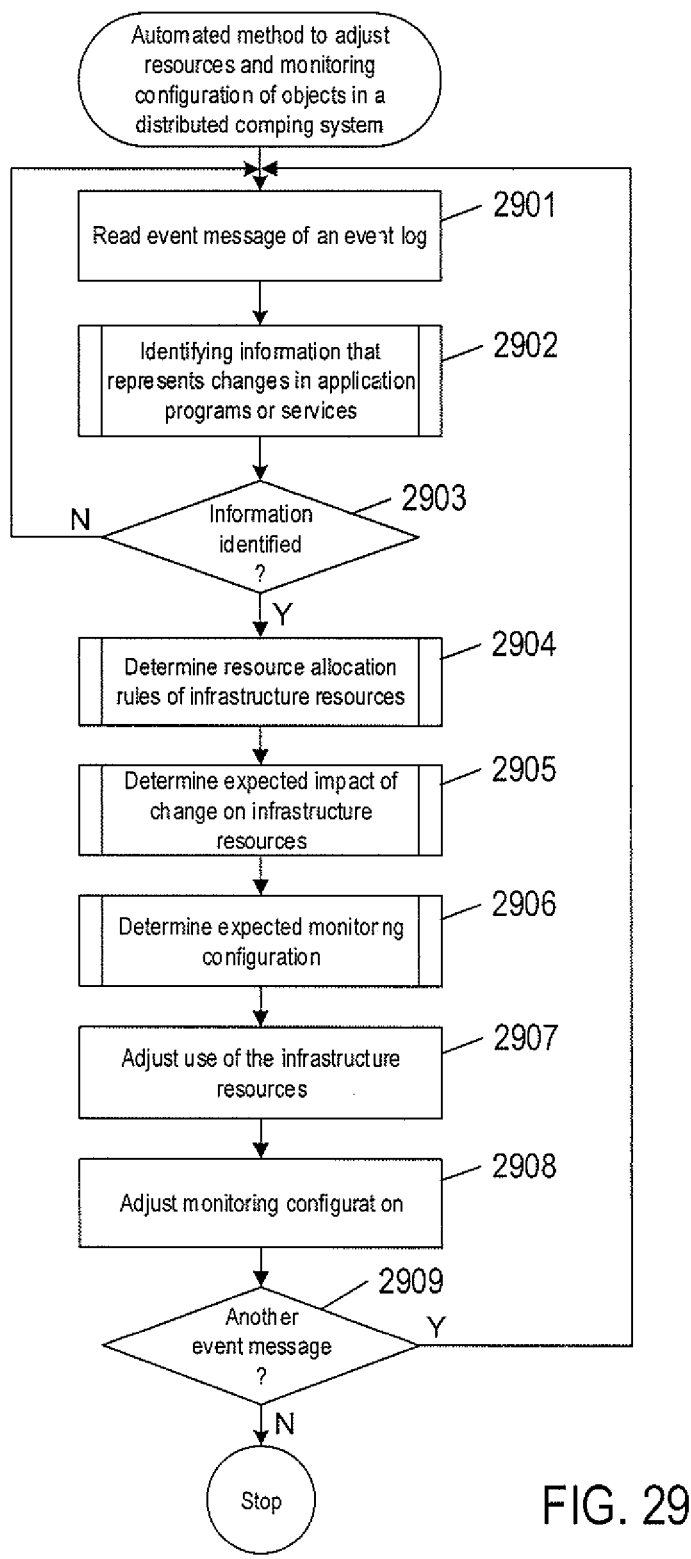
FIG. 29 shows a control-flow diagram of an automated method to adjust resources and monitoring configuration of objects in a distributed computing system.

FIG. 29 shows a control-flow diagram of an automated method to adjust resources and monitoring configuration of objects in a distributed computing system. In block 2901, an event message written to an event log is read. The event messages may be written to the event log as described above with reference to FIGS. 21 and 25. In block 2902, a routine "identify information that represents changes in application programs or services" is called. In decision block 2903, if information identifying a change in application program is found, control flow to block 2904. In block 2904, a routine "determine resource allocation rules of infrastructure resources" is called. In block 2905, a routine "determine expected impact of change on infrastructure resources" is called. In block 2906, a routine "determine rules of expected monitoring configuration" is called. In block 2907, the infrastructure resources to be used by the application program are adjusted as described above with reference to FIGS. 24, 27B and 28. In block 2908, the monitoring tool 1902 and log monitoring agent are adjusted according to the expected monitoring configuration determined in block 2906 as described above with reference to FIGS. 22 and 26.

Figure 30:
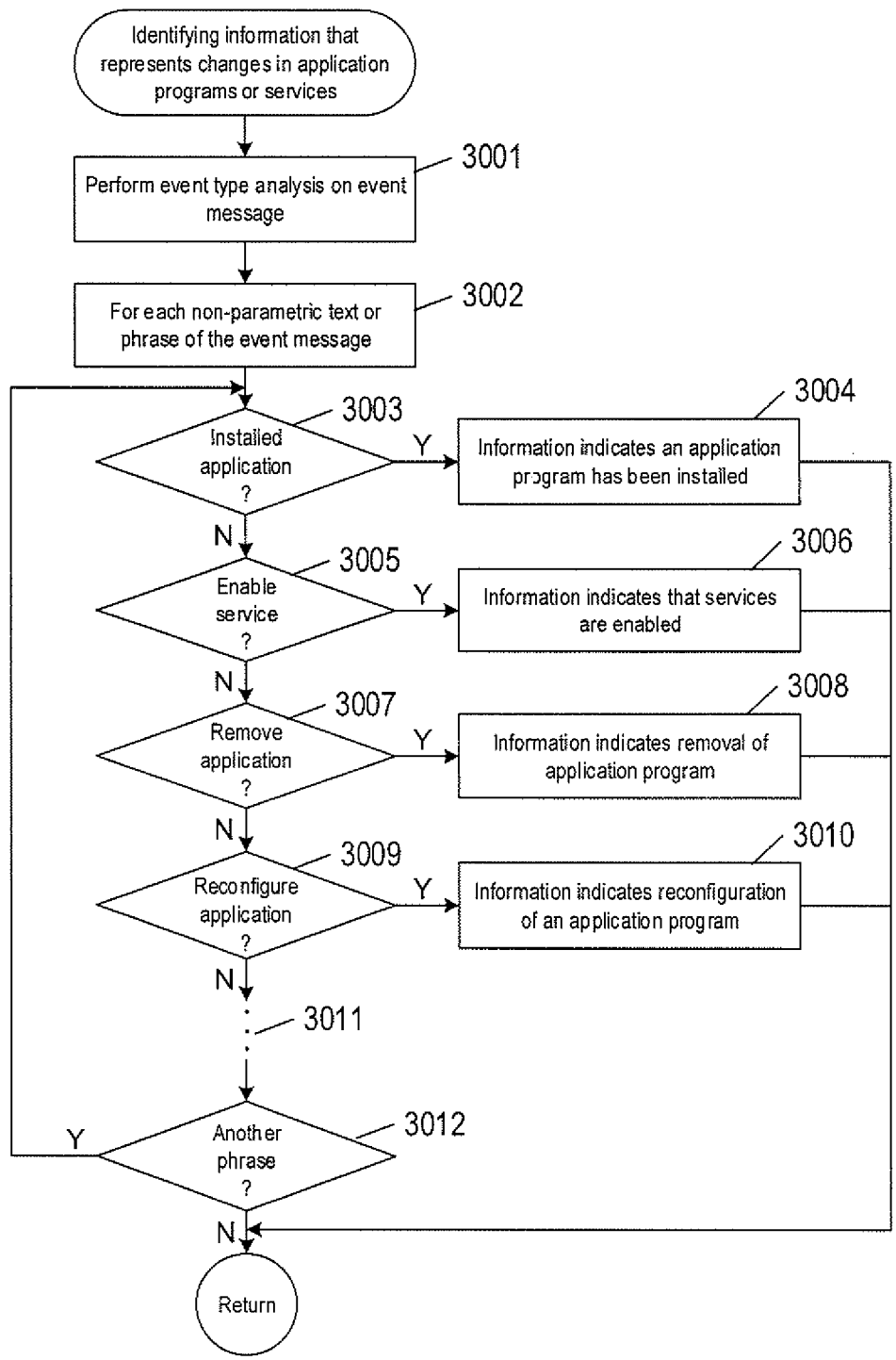
FIG. 30 shows a control-flow diagram of routine "identifying information that represents changes in application programs or services" called in of FIG. 29.

FIG. 30 shows a control-flow diagram of routine "identify information that represents changes in application programs or services" called in block 2902 of FIG. 29. In block 3001, the event message is searched for non-parametric text and phrases as described above with reference to FIGS. 22 and 26. A loop beginning with block 3002 repeats the operations represented by blocks 3003-3009 for each non-parametric text or phrase of the event message. In decision block 3003, when the text or phrases describe the application program as being installed in a VM or container, control flows to block 3004. In block 3004, the information indicates the application program has been installed. In decision block 3005, when the text or phrases indicate services of the application program have enabled (i.e., start installed service or restart a previously running service), control flows to block 3006. In block 3006, the information indicates services of the application program have started. In decision block 3007, when the text or phrases describe an application program of VM or container as being removed, control flows to block 3008. In block 3008, the information indicates the application program has been removed. In decision block 3009, when the text or phrases describe the application program running in a VM or container as being reconfigured, control flows to block 3010. In block 3010, the information indicates the application program has been reconfigured. Ellipsis 3011 represent other non-parametric text or phrases that may be used to identify information iii the event message that represents changes to application program or services provided by the application program. In decision block 3012, control flows back to decision block 3003 for another non-parametric text or phrase.

Figure 31:
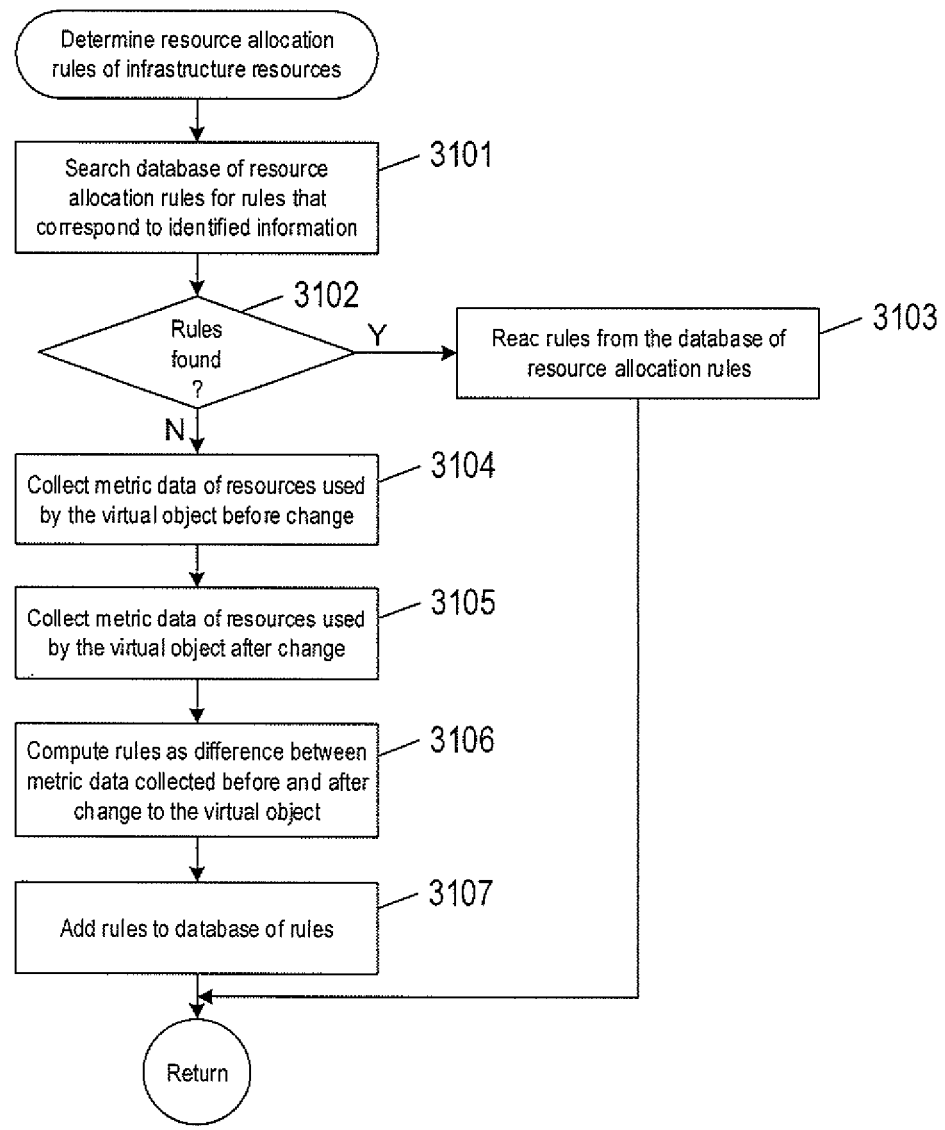
FIG. 31 shows a control-flow diagram of the routine "determine resource allocation rules of infrastructure resources" called in FIG. 29.

FIG. 31 shows a control-flow diagram of the routine "determine resource allocation rules of infrastructure resources" called in block 2904 of FIG. 29. In block 3101, a database of rules is searched for rules that match the information identified in block 2902, as described above with reference to FIGS. 22 and 26. In decision block 3102, when rules are obtained from the database of rules, control flows to block 3103. In block 3103, the rules are read from the database of rules and returned. In block 3104, metric data associated with infrastructure resources used by the virtual object before the change are collected as described above with reference to FIG. 29. In block 3105, metric data associated with infrastructure resources used by the virtual object after the change are collected as described above with reference to FIG. 29. In block 3106, rules are computed based on the metric data collected before and after the change as described above with reference to Equation (8).

Figure 32:
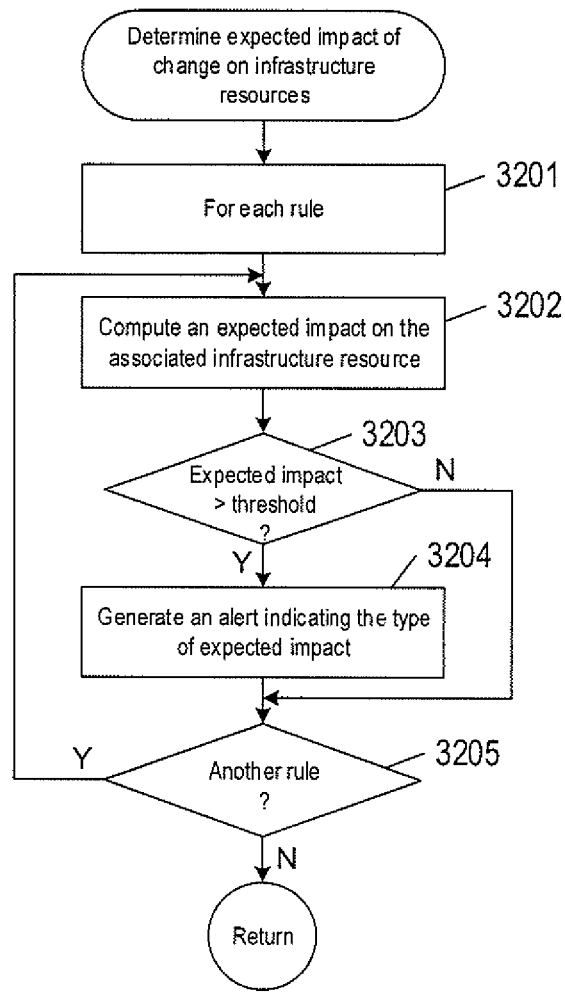
FIG. 32 shows a control-flow diagram of the routine "determine expected impact of change on infrastructure resources" called in FIG. 29.

FIG. 32 shows a control-flow diagram of the routine "determine expected impact of change on infrastructure resources" called in block 2905 of FIG. 29. A loop beginning with block 3201 repeats the operations represented by blocks 3202-3207 for each rule. In block 3202, an expected impact on the associated infrastructure resource is computed as described above with reference to Equations (1) and (5). In decision block 3203, when the expected impact is greater than an impact threshold for the infrastructure resource, control flow to block 3204. In block 3204, an alert is generated indicating the expected impact on the infrastructure resource. In decision block 3205, blocks 3202-3204 are repeated for another rule.

Figure 33:
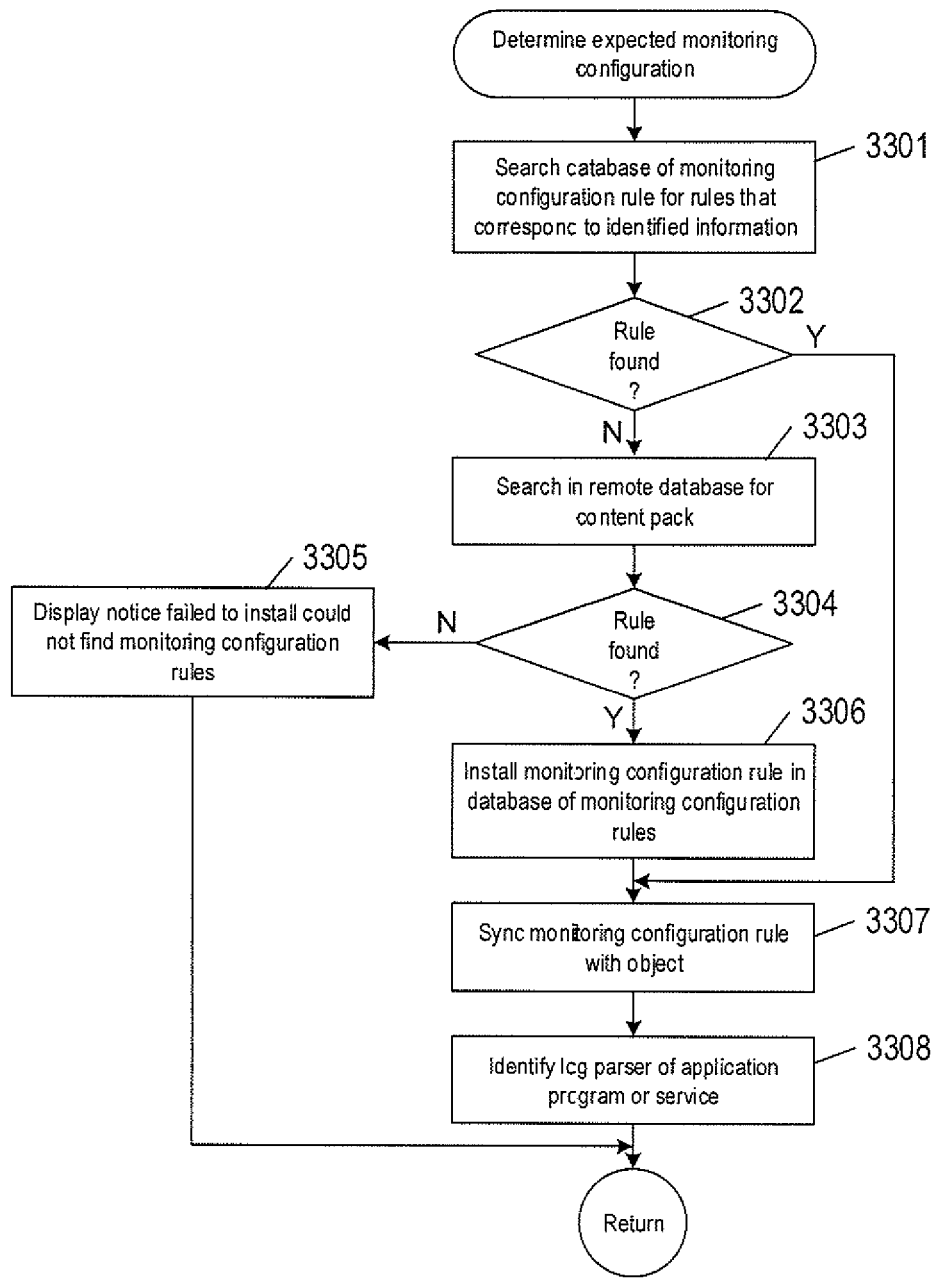
FIG. 33 shows a control-flow diagram of the routine "determine expected monitoring configuration" called in FIG. 29

FIG. 33 shows a control-flow diagram of the routine "determine rules of expected monitoring configuration" called in block 2906 of FIG. 29. In block 3301, a database of monitoring configuration rules is searched for rules that correspond to the identified information. In block 3302, a log path associated with the new application program or service is identified. In block 3303, a log parse associated with the new application program or service is identified. In block 3304, a content pack of the new application program or services is retrieved.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method stored in one or more data-storage devices and executed using one or more processors of a management server computer of a distributed computing system to adjust resources and monitoring configuration of objects in the distributed computing system, the method comprising:
using a monitoring tool of the management server computer to identify information recorded in event messages that indicates a change to an object of the distributed computing system;
determining infrastructure resource allocation rules for the distributed computing system based on the information;
determining monitoring configuration rules for the object and the monitoring tool based on the information;
adjusting infrastructure resources of the distributed computing system to accommodate the change to the object based on the resource allocation rules; and
adjusting a monitoring configuration of the monitoring tool and the object based on the monitoring configuration rules.

2. The method of claim 1, wherein using a monitoring tool of the management server computer to identify the information comprises identifying non-parametric text, phrases or event types of event messages generated by event sources of the object that indicate one of installation of an application program at the object, enable services provided by an application program located at the object, removal of an application program from the object, disable services provided by an application program located on the object, and restructure an application program running in the object.

3. The method of claim 1, wherein determining the resource allocation rules for the distributed computing system comprises searching a database of application resource allocation rules for a rule of expected use of infrastructure resources based on the information.

4. The method of claim 1, wherein determining the monitoring configuration rules comprises searching a database of monitoring configuration rules for an expected monitoring configuration based on the information.

5. The method of claim 1, wherein determining the resource allocation rules comprises:
when rules are not available for the application program, collecting metric data of infrastructure resources used by the object before the change in the application program;

collecting metric data of the infrastructure resources used by the object after the change in the application program;

compute rules as a difference between the metric data collected before and after the change in the object; and storing the rule in a database of resource allocation rules.

6. The method of claim 1, wherein determining the resource allocation rules based on the information comprises computing the expected impact on the infrastructure resources of the distributed computing system based on current use of the infrastructure resources and the expected use of the infrastructure resources.

7. The method of claim 1, wherein adjusting the infrastructure resources of the distributed computing system comprises:

generating an alert identifying the infrastructure resources expected to be impacted by the change;

scaling up infrastructure resources available to the object, when the object is a virtual object and an application program or service supported by the object is installed or enabled; and scaling down infrastructure resources available to the object, when the object is a virtual object and an application program or service supported by the object is removed, disabled or stopped.

8. The method of claim 1, wherein adjusting the infrastructure resources of the distributed computing system comprises:

generating an alert identifying the infrastructure resources as expected to be impacted by the change; and migrating the object from one server computer to another server computer of distributed computing system, when the object is a virtual object.

9. The method of claim 1, adjusting the monitoring configuration of the monitoring tool and the object comprises:

plugging in a content pack to the monitoring tool, the content pack associated with change to the object; and reconfiguring a log monitoring agent to include a log path and a log parse associated with the change to the object.

10. A system to adjust resources and monitoring configuration of objects in the distributed computing system in a distributed computing system, the system comprising:

one or more processors;

one or more data-storage devices; and machine-readable instructions stored in the one or more data-storage devices that when executed using the one or more processors controls the system to perform the operations comprising:

using a monitoring tool of the management server computer to identify information recorded in event messages that indicates a change to an object of the distributed computing system;

determining infrastructure resource allocation rules for the distributed computing system based on the information;

determining monitoring configuration rules for the object and the monitoring tool based on the information;

adjusting infrastructure resources of the distributed computing system to accommodate the change to the object based on the resource allocation rules; and adjusting a monitoring configuration of the monitoring tool and the object based on the monitoring configuration rules.

11. The system of claim 10, wherein using a monitoring tool of the management server computer to identify the information comprises identifying non-parametric text, phrases or event types of event messages generated by event sources of the object that indicate one of installation of an application program at the object, enable services provided by an application program located at the object, removal of an application program from the object, disable services provided by an application program located on the object, and restructure an application program running in the object.

12. The system of claim 10, wherein determining the resource allocation rules for the distributed computing system comprises searching a database of application resource allocation rules for a rule of expected use of infrastructure resources based on the information.

13. The system of claim 10, wherein determining the monitoring configuration rules comprises searching a database of monitoring configuration rules for an expected monitoring configuration based on the information.

14. The system of claim 10, wherein determining the resource allocation rules comprises:

when rules are not available for the application program, collecting metric data of infrastructure resources used by the object before the change in the application program;

collecting metric data of the infrastructure resources used by the object after the change in the application program;

compute rules as a difference between the metric data collected before and after the change in the object; and storing the rule in a database of resource allocation rules.

15. The system of claim 10, wherein determining the resource allocation rules based on the information comprises computing the expected impact on the infrastructure resources of the distributed computing system based on current use of the infrastructure resources and the expected use of the infrastructure resources.

16. The system of claim 10, wherein adjusting the infrastructure resources of the distributed computing system comprises:

generating an alert identifying the infrastructure resources expected to be impacted by the change;

scaling up infrastructure resources available to the object, when the object is a virtual object and an application program or service supported by the object is installed or enabled; and scaling down infrastructure resources available to the object, when the object is a virtual object and an application program or service supported by the object is removed, disabled or stopped.

17. The system of claim 10, wherein adjusting the infrastructure resources of the distributed computing system comprises:

generating an alert identifying the infrastructure resources as expected to be impacted by the change; and migrating the object from one server computer to another server computer of distributed computing system, when the object is a virtual object.

18. The system of claim 10, adjusting the monitoring configuration of the monitoring tool and the object comprises:

plugging in a content pack to the monitoring tool, the content pack associated with change to the object; and reconfiguring a log monitoring agent to include a log path and a log parse associated with the change to the object.

19. A non-transitory computer-readable medium encoded with machine-readable instructions that implement a method carried out by one or more processors of a computer system to perform the operations comprising:
- using a monitoring tool of the management server computer to identify information recorded in event messages that indicates a change to an object of the distributed computing system;
- determining infrastructure resource allocation rules for the distributed computing system based on the information;
- determining monitoring configuration rules for the object and the monitoring tool based on the information;
- adjusting infrastructure resources of the distributed computing system to accommodate the change to the object based on the resource allocation rules; and
- adjusting a monitoring configuration of the monitoring tool and the object based on the monitoring configuration rules.

20. The medium of claim 19, wherein using a monitoring tool of the management server computer to identify the information comprises identifying non-parametric text, phrases or event types of event messages generated by event sources of the object that indicate one of installation of an application program at the object, enable services provided by an application program located at the object, removal of an application program from the object, disable services provided by an application program located on the object, and restructure an application program running in the object.

21. The medium of claim 19, wherein determining the infrastructure resource allocation rules for the distributed computing system comprises searching a database of application resource allocation rules for a rule of expected use of infrastructure resources based on the information.

22. The medium of claim 19, wherein determining the monitoring configuration rules comprises searching a database of monitoring configuration rules for an expected monitoring configuration based on the information.

23. The medium of claim 19, wherein determining the resource allocation rules comprises,
- collecting metric data of infrastructure resources used by the object before the change in the application program;
- collecting metric data of the infrastructure resources used by the object after the change in the application program;
- compute rules as a difference between the metric data collected before and after the change in the object; and
- storing the rule in a database of resource allocation rules.

24. The medium of claim 19, wherein determining infrastructure resource allocation rules based on the information comprises computing the expected impact on the infrastructure resources of the distributed computing system based on current use of the infrastructure resources and the expected use of the infrastructure resources.

25. The medium of claim 19, wherein adjusting the infrastructure resources of the distributed computing system comprises:
- generating an alert identifying the infrastructure resources expected to be impacted by the change;
- scaling up infrastructure resources available to the object, when the object is a virtual object and an application program or service supported by the object is installed or enabled; and
- scaling down infrastructure resources available to the object, when the object is a virtual object and an application program or service supported by the object is removed, disabled or stopped.

26. The medium of claim 19, wherein adjusting the infrastructure resources of the distributed computing system comprises:
- generating an alert identifying the infrastructure resources as expected to be impacted by the change; and
- migrating the object from one server computer to another server computer of distributed computing system, when the object is a virtual object.

27. The medium of claim 19, adjusting the monitoring configuration of the monitoring tool and the object comprises:
- plugging in a content pack to the monitoring tool, the content pack associated with change to the object; and
- reconfiguring a log monitoring agent to include a log path and a log parse associated with the change to the object.

* * * * *